(12) United States Patent
Washio

(10) Patent No.: US 8,521,132 B2
(45) Date of Patent: Aug. 27, 2013

(54) ABNORMALITY DETECTING APPARATUS FOR COMMUNICATION TERMINAL AND ABNORMALITY DETECTING METHOD FOR COMMUNICATION TERMINAL

(75) Inventor: Nobuyuki Washio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 361 days.

(21) Appl. No.: 12/835,222

(22) Filed: Jul. 13, 2010

(65) Prior Publication Data
US 2011/0016363 A1    Jan. 20, 2011

(30) Foreign Application Priority Data

Jul. 15, 2009  (JP) ................................ 2009-166203

(51) Int. Cl.
*H04M 1/66* (2006.01)
*G06F 11/00* (2006.01)

(52) U.S. Cl.
USPC .............................. 455/411; 455/410; 714/57

(58) Field of Classification Search
USPC .................. 379/37, 45, 102, 106; 455/404.1, 455/410, 411; 345/173; 714/57
See application file for complete search history.

(56) References Cited

U.S. PATENT DOCUMENTS

| | | | |
|---|---|---|---|
| 5,848,354 A | 12/1998 | Kamalski | |
| 6,163,604 A | 12/2000 | Baulier | |
| 6,359,557 B2 * | 3/2002 | Bilder | 340/531 |
| 2006/0079201 A1 * | 4/2006 | Chung et al. | 455/410 |
| 2007/0139392 A1 * | 6/2007 | Kim | 345/173 |

FOREIGN PATENT DOCUMENTS

| | | |
|---|---|---|
| JP | 10-503346 A | 3/1998 |
| JP | 2002-135248 A | 5/2002 |
| JP | 2004-096502 | 3/2004 |
| JP | 2006-196949 | 7/2006 |
| JP | 2007-133811 | 5/2007 |
| JP | 2007-228384 | 9/2007 |
| JP | 2007-266944 | 10/2007 |
| JP | 2008-210085 | 9/2008 |
| JP | 2009-022042 | 1/2009 |

* cited by examiner

*Primary Examiner* — Nizar Sivji
(74) *Attorney, Agent, or Firm* — Fujitsu Patent Center

(57) ABSTRACT

An abnormality detection apparatus for communication terminal that detects an abnormality based on terminal information regarding operations and callings on the communication terminal, and an abnormality detection method are provided to prevent frauds using communication terminals such as a telephone set. A abnormality detection apparatus for communication terminal, including: a pattern model storage unit configured to store behavior pattern models as a probabilistic model of transition relations of events relevant to operations and calls on a communication terminal; a terminal information obtaining unit configured to detect terminal information about the operations and the calls on the communication terminal; a pattern determination unit configured to determine whether or not a current behavior pattern is a normal behavior pattern by comparing the terminal information detected by the terminal information obtaining unit with the behavior pattern models stored in the pattern model storage unit; and a warning generation unit configured to output predetermined warning information when the pattern determination unit determines that the terminal information detected by the terminal information obtaining unit is not within a normal behavior pattern.

11 Claims, 25 Drawing Sheets

ABNORMALITY DETECTING APPARATUS FOR COMMUNICATION TERMINAL AND ABNORMALITY DETECTING METHOD FOR COMMUNICATION TERMINAL

CROSS-REFERENCE TO RELATED APPLICATION

This application is based upon and claims the benefit of priority of the prior Japanese Patent Application No. 2009-166203, filed on Jul. 15, 2009, the entire contents of which are incorporated herein by reference.

FIELD

The present invention relates to an abnormality detecting apparatus for a communication terminal and an abnormality detecting method for a communication terminal.

BACKGROUND

As an apparatus to prevent phone call frauds, Patent Document 1 (Japanese Patent Application Laid-Open No. 2006-196949) discusses a telephone set that is configured to give a warning based on contents of a phone call. The telephone set includes a word register for keywords to be detected from calling voice data, so that, if a keyword in the word register is found in calling voice data, the set gives a warning.

Patent Document 2 (Japanese Patent Application Laid-Open No. 2008-210085) discloses an apparatus configured to determine whether or not contents of a phone call relates to fraud based on detection of a keyword from calling voice data and references to voice print database and bank account database.

In the configuration discussed in Patent Document 1, abnormality such as fraud is detected only based on keyword detection that is obtained through voice recognition of calling voice data. Accordingly, in the cases with unclear voices or low S/N ratios of calling voice data, the accuracy of voice recognition and thus the accuracy of abnormality detection are reduced.

In the configuration discussed in Patent Document 2, recognition of information other than keywords is used for improved accuracy of abnormality detection. The approach, however, requires collections of information for constructions of keyword dictionary, voice print database, bank account information database, and the like, which requires constant update of the databases for current information. As a result, the apparatus using the information such as keyword, voice print, bank account number cannot be completely caught up with before it is used in new fraud.

SUMMARY

In order to prevent frauds that use communication terminals such as a telephone set, the present invention provides an abnormality detection apparatus for communication terminal that detects an abnormality based on terminal information about operations and calls on the communication terminal, and an abnormality detection method for communication terminal.

An abnormality detection apparatus for communication terminal of the present invention includes: a pattern model storage unit configured to store behavior pattern models as a probabilistic model of transition relations of events relevant to operations and calls on a communication terminal; a terminal information obtaining unit configured to detect terminal information about the operations and the calls on the communication terminal; a pattern determination unit configured to determine whether or not a current behavior pattern is a normal behavior pattern by comparing the terminal information detected by the terminal information obtaining unit with a behavior pattern model stored in the pattern model storage unit; and a warning generation unit configured to output predetermined warning information when the pattern determination unit determines that the terminal information detected by the terminal information obtaining unit is not a normal behavior pattern.

A device according to the present invention is configured to compare terminal information about an operation and a call on a communication terminal with behavior pattern models to determine whether or not the information is within a normal behavior pattern or an abnormal behavior pattern, and to output warning information, based on the determination result indicating that the call can be a fraud, to prevent a fraud. Because the behavior patterns are probabilistic modeled, a probability of a current behavior pattern can be calculated by applying the current behavior pattern to the models, so that the probability is used to determine whether the behavior pattern is within a normal behavior or an abnormal behavior.

The behavior pattern models can be each stored as a normal behavior pattern and/or abnormal behavior pattern.

According to the call history, the transition probabilities between events in a behavior pattern model can be learned, leading to more reliable detection of an abnormal behavior pattern.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The present invention will be described in detail with the following embodiments.

(Outline of Configuration)

Figure 1:
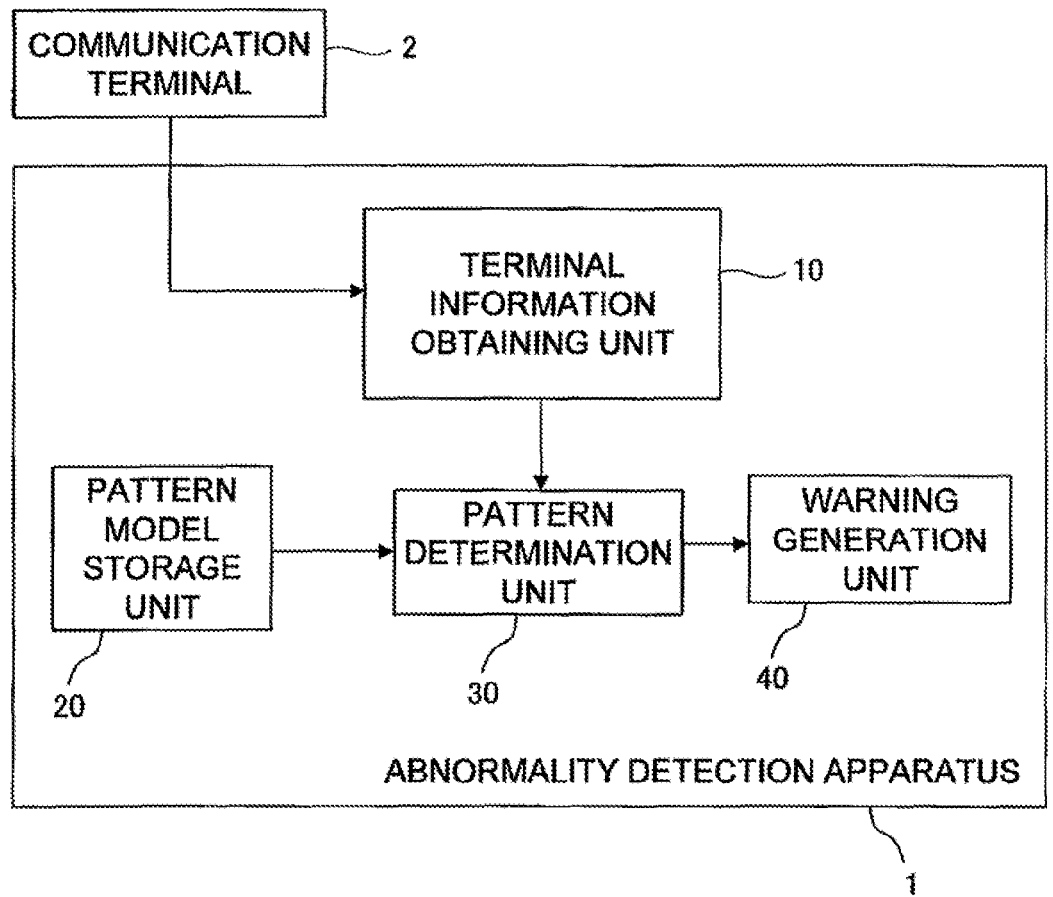
FIG. 1 is an example of a functional block diagram illustrating an outline of a configuration of an abnormality detection apparatus.

FIG. 1 is a functional block diagram illustrating an outline of a configuration of an abnormality detection apparatus for communication terminal.

An abnormality detection apparatus 1 is connected to a communication terminal 2 to receive various information of the communication terminal 2. The abnormality detection apparatus 1 includes a terminal information obtaining unit 10, a pattern model storage unit 20, a pattern determination unit 30, and a warning generation unit 40.

The terminal information obtaining unit 10 obtains terminal information about operations and calls on the communication terminal 2, and detects the terminal information such as information about a call during a communication, information about operations on the communication terminal 2 by a user, and information about a location of the terminal. The information about a call includes a ratio of periods of time for speaking on a source side to that on a recipient side at the communication terminal 2 (a ratio of speaking time), an elapsed time after the start of a call (calling time), time (calling start time, calling end time), information about a caller (call source number), and contents of the call (keyword, topic). The information about terminal operations by a user includes an operation history of a telephone directly for updating the data therein, and other operation histories using input keys. If the communication terminal 2 is provided with a GPS system, a current location of the communication terminal 2 may be obtained using a GPS unit in the system. Alternatively, a current location of the communication terminal 2 may be obtained through a communication with a base station.

The pattern model storage unit 20 stores transition relations between a plurality of events relevant to operations and calls on the terminal, as behavior pattern models. Each of the behavior pattern model can be configured with events that each specify values of terminal information about operations and calls on the communication terminal 2, so that the destination event of the transition varies depending on the value of the terminal information of the communication terminal 2 in the event.

The call pattern determination unit 30 determines, based on the terminal information detected by the terminal information obtaining unit 10, whether or not a current behavior pattern of a current user of the communication terminal corresponds to a normal behavior pattern stored in the pattern model storage unit 20. When determined that the current behavior pattern of the user does not correspond to the normal behavior pattern, the call pattern determination unit 30 transmits a signal to the warning generation unit 40, the signal indicating that the behavior pattern of the user is an abnormal behavior pattern.

The warning generation unit 40 outputs predetermined warning information, upon receipt of the signal indicating that the current behavior pattern of the user is an abnormal behavior pattern from the pattern determination unit 30.

The abnormality detection apparatus 1 may be configured as a functional module that is incorporated in the communication terminal 2, or may be incorporated in other system that can be connected to the communication terminal 2 on line. Alternatively, some units of the abnormality detection apparatus 1 may be configured as functional modules that are incorporated in the communication terminal 2, with the remaining units being in other system. For example, the terminal information obtaining unit 10 may be configured as a functional module in the communication terminal 2, with the pattern model storage unit 20, the pattern determination unit 30, and the warning generation unit 40 being in other system that can be connected to the communication terminal 2 on line.

Figure 2:
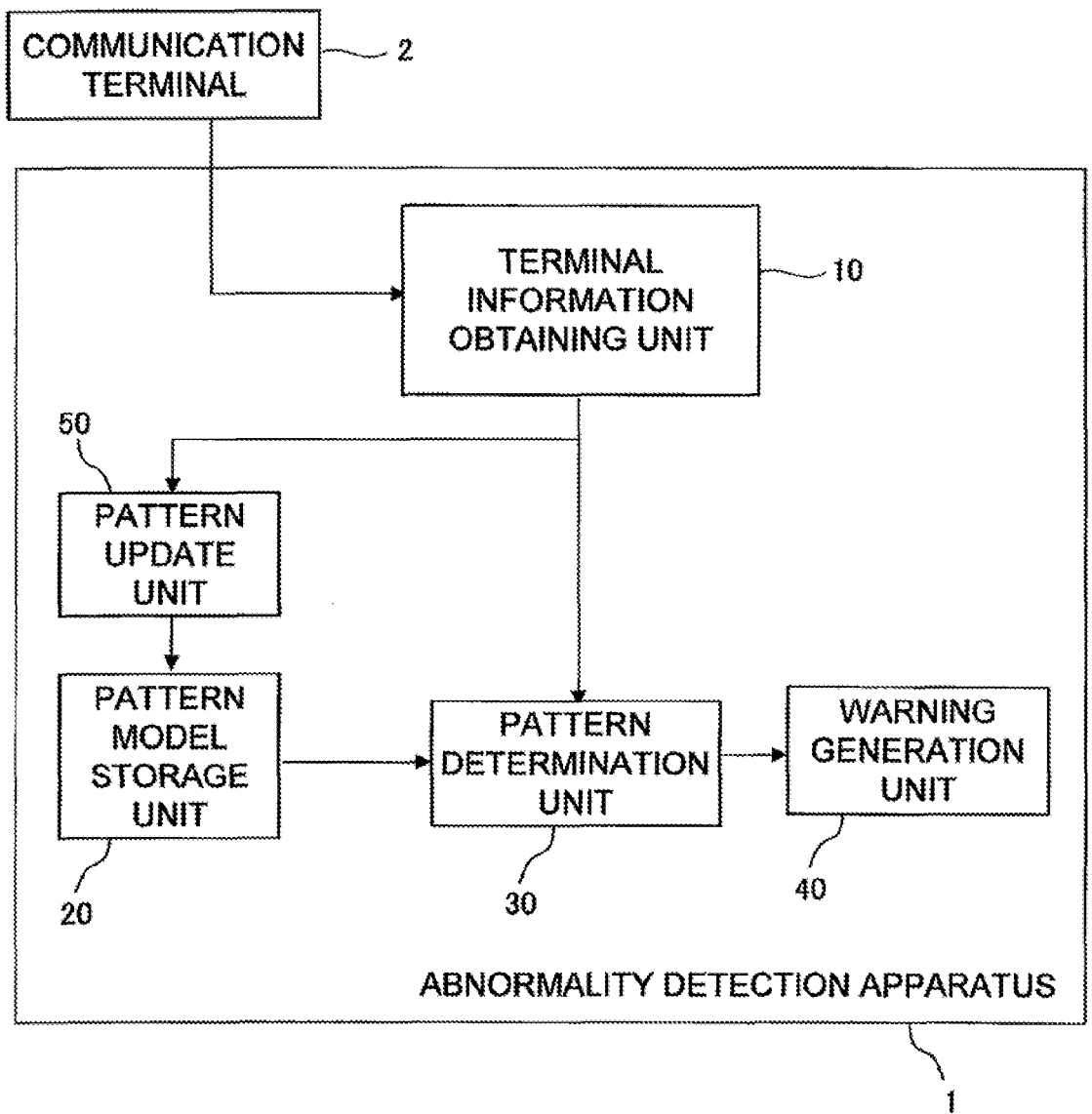
FIG. 2 is an example of a functional block diagram illustrating an outline of another configuration of an abnormality detection apparatus.

FIG. 2 is a functional block diagram illustrating an outline of another configuration of an abnormality detection apparatus for communication terminal.

An abnormality detection apparatus 1 in FIG. 2 further includes a pattern update unit 50 in addition to a terminal information obtaining unit 10, a pattern model storage unit 20, a pattern determination unit 30, and a warning generation unit 40. The pattern update unit 50 updates behavior pattern models stored in the pattern model storage unit 20. The pattern update unit 50 can change probabilities of automata based on an actual behavior pattern of a user, in cases where the behavior pattern models stored in the pattern model storage unit 20 are represented by automata with probabilities, each of the automata including transition relations between a plurality of events.

An automaton having probabilities makes a transition from a state to another state upon every receipt of an event, the transition being accompanied by an occurrence probability of the event, and the automaton accumulates the occurrence probabilities of the succeeding events throughout transitions. In a final state of an automaton having probabilities, the cumulative probability provides the probability of the succeeding events. Such a probabilistic automaton that represents a behavior pattern model can be achieved by a deterministic automaton (deterministic automaton having probabilities) that uniquely determines a destination of a transition depending on an occurred event.

(Behavior Pattern Model)

A behavior pattern model expresses a transition pattern of a plurality of events which are representations of behaviors of a user and terminal information obtained from a communication terminal, based on calls and operations on the communication terminal.

Figure 3:
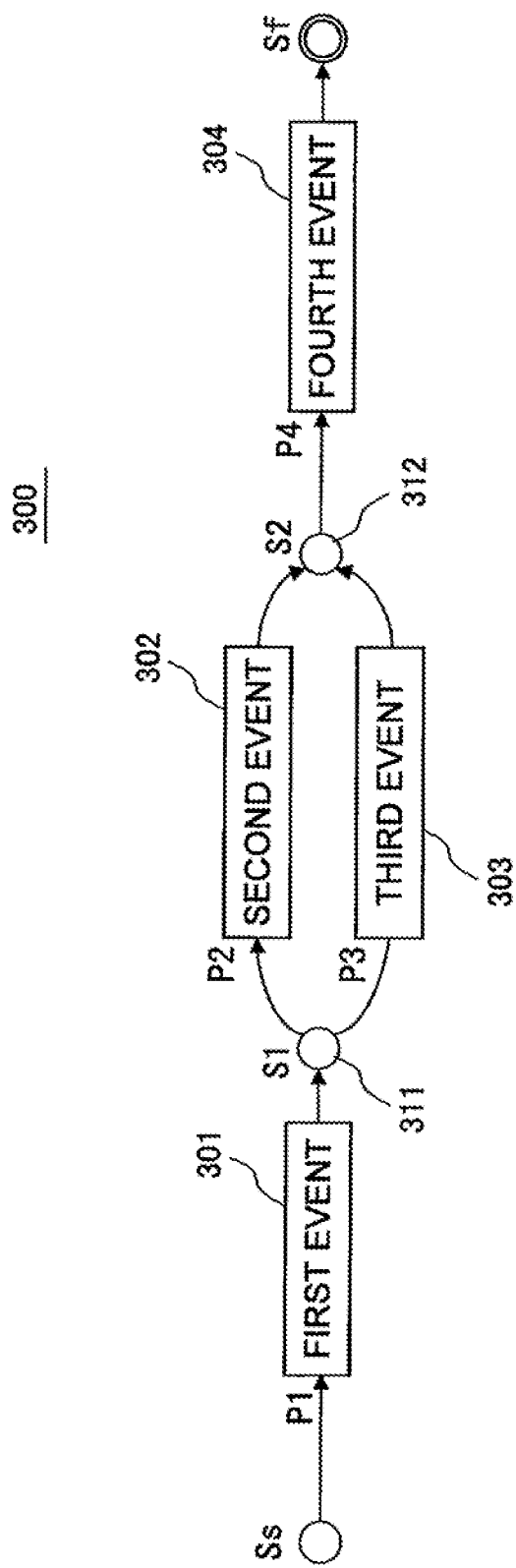
FIG. 3 illustrates an example of a conceptual diagram of a behavior pattern model.

FIG. 3 illustrates a conceptual diagram of a behavior pattern model stored in the pattern model storage unit 20.

The behavior pattern model 300 illustrated in FIG. 3 transits from an initial state Ss to a final state Sf through a first state S1 and a second state S2. The state transitions are each triggered by an event which is a condition for the state transition, and each have a record of an event occurrence probability at which the event occur.

The behavior pattern model 300 transits from the initial state Ss to the first state S1 when a first event 301 occurs. The transition from the initial state Ss to the first state S1 through the first event 301 occurs at a first event occurrence probability P1.

The behavior pattern model 300 transits from the first state S1 to the second state S2 through the branches of a second event 302 or a third event 303. The transition from the initial state Ss to the second state S2 through the second event 302 occurs at a second event occurrence probability P2, whereas the transition from the initial state Ss to the second state S2 through the third event 303 occurs at a third event occurrence probability P3.

The behavior pattern model 300 transits from the second state S2 to the final state Sf through a fourth event 304. The transition from the second state S2 to the final state Sf through the fourth event 304 occurs at a fourth event occurrence probability P4.

As described above, the behavior pattern model 300 can be constructed with a probabilistic automaton that is represented by the transition relations between states.

The occurrence probabilities P1 to P4 for the events 301 to 304 respectively can be stored in the pattern model storage unit 20 in advance as predictable event occurrence probabilities. As illustrated in FIG. 2, in the case where the apparatus 1 is provided with the pattern update unit 50, the occurrence probabilities P1 to P4 for the events 301 to 304 respectively may be sequentially calculated based on the terminal information that varies depending on the actual usage of the communication terminal 2, so that the calculated occurrence probabilities are used to update event occurrence probabilities stored in the pattern model storage unit 20.

The behavior pattern model 300 as illustrated in FIG. 3 may be set to be a typical pattern model that can be applied to each situation where the communication terminal 2 is used and can be stored in the pattern model storage unit 20 together with the transition relations in the typical pattern model.

Among the transition states in FIG. 3, the state represented by the double-circle mark is a final state, as in a typical representation for an automaton, and the transition to the final state means an acceptance by an automaton. When the transition reaches the final state, the pattern determination unit 30 computes a cumulative probability at which a current behavior pattern occurs, based on the occurrence probabilities for the events that triggered the transitions, which is used to calculate a degree of abnormality. There may be one or more final states.

(Normal Behavior Model)

Figure 4:
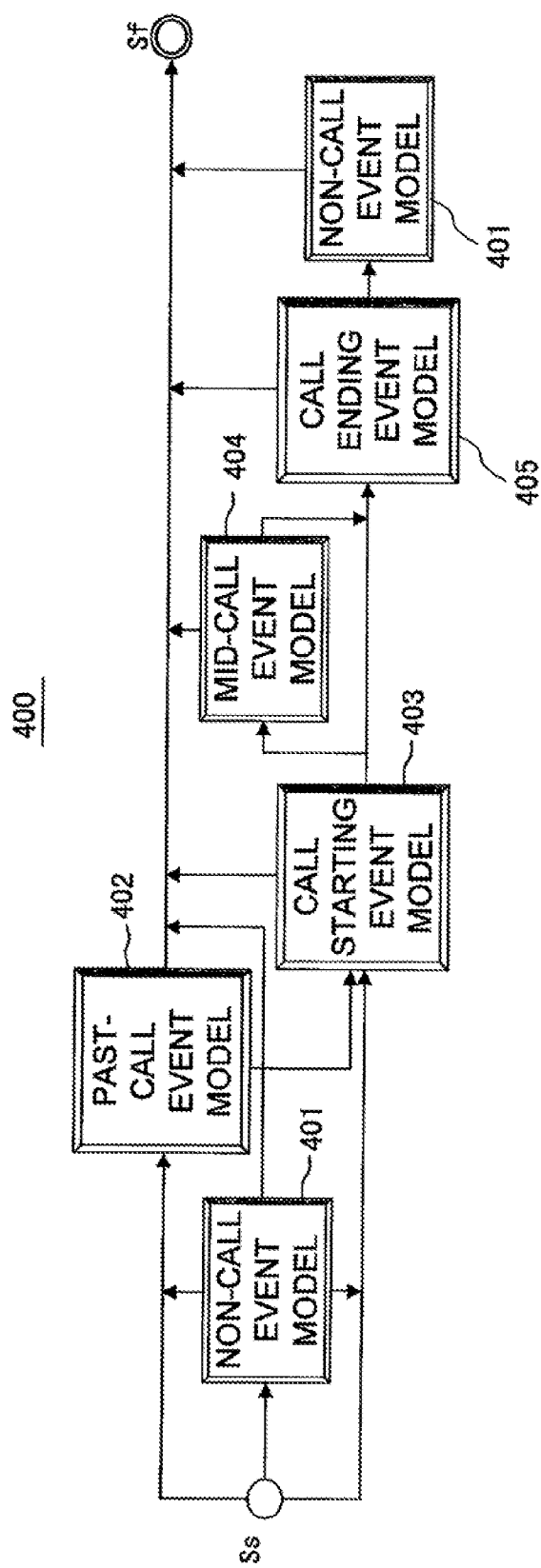
FIG. 4 illustrates an example of a behavior pattern model.

FIG. 4 illustrates an example of a normal behavior pattern model that constitutes a behavior pattern as a collection of a plurality of typical pattern models.

A behavior pattern model 400 illustrates state transitions with probabilities of events that occur following behaviors of a user, and covers any type of the behavior pattern.

Between the initial state Ss and the final state Sf in the behavior pattern model 400, there are typical pattern models, each model having a plurality of events. Each event in each of the typical pattern models has an event occurrence probability, and the event occurrence probabilities of the events between the initial state Ss and the final state Sf are multiplied with one another to obtain a cumulative probability. A higher cumulative probability can be determined as a behavior closer to a normal behavior model, whereas a cumulative probability lower than a predetermined value can be determined as a behavior closer to an abnormal behavior.

The behavior pattern model 400 illustrated in FIG. 4 includes typical pattern models such as a non-call event model 401, a past-call event model 402, a call starting event model 403, a mid-call event model 404, and a call ending event model 405.

The non-call event model 401 includes events that determine a behavior pattern of a user based on the terminal information about operations no relevant to a call by the user. Examples of the events in the non-call event model 401 are update of an address book and the movement of the terminal in use. The update of an address book is event information about key operation performed by a user for updating an address book stored in the communication terminal 2. The movement of the terminal is event information about a current location and a shift speed of the communication terminal 2 based on location information that is obtained from a GPS system of the communication terminal 2 or through communication with a base station.

The past-event model 402 includes events that determine a behavior pattern of a user with reference to the terminal information about calls in the past. Examples of the events in the past-event model 402 are a fact whether or not a current caller is the same as that of a previous call, a fact whether or not a current number is the same as that of a previous call, a time interval from a previous call, and a call frequency with a caller. These events are used to determine whether or not a current behavior is within a normal behavior pattern, by comparing the phone number that is currently coming in or the phone number of a current call with the terminal information of the previous call stored in a predetermined storage area as call history information.

The call starting event model 403 includes events based on the terminal information relevant to start of a call. Examples of the events in the call starting event model 403 are the person who is calling the terminal, a fact whether or not the caller is registered in the address book, a fact whether or not the call is an answer to a call from the communication terminal 2, a fact whether or not the call comes in from a person whose number is already notified, a time the call starts, and a time interval from the previous call.

The mid-call event model 404 includes events based on the terminal information in the middle of a call on the communication terminal 2. Examples of the events in the mid-call event model 404 are a ratio between the speaking periods of time in a call, a total period of time of a call, and an end time of a call. The speaking time ratio is determined between the speaking periods of time on the source side and that on the recipient side in a call on the communication terminal 2, which is sequentially calculated based on the voice data in the call. The total call time is a period of time of a call on the communication terminal 2 which is counted from the start of the call by a counter. The end time of a call is the information about the time when a call on the communication terminal communication terminal 2 ends.

The call ending event model 405 includes events based on the terminal information relevant to the end of a call on the communication terminal 2. Examples of the events in the call ending event model 405 are a ratio between the speaking times in a call, a total period of time of a call, and an end time of a call. As in the mid-call event model 404, the speaking time ratio is determined between the speaking time on the source side and that on the recipient side in a call on the communication terminal 2. The ratio can be calculated at the end of a call, which may be set to a predetermined value. The total call time is a period of time of a call on the communication terminal 2 which is information about a time period from the start to end of the call. The end time of a call is the information of the end time of a call on the communication terminal 2.

As described above, the behavior pattern model 400 that represents a normal behavior pattern is constructed by combining typical pattern models. The behavior pattern model 400 in FIG. 4 for a normal behavior pattern includes the non-call event model 401, the past-call event model 402, the call starting event model 403, the mid-call event model 404, the call ending event model 405 and another non-call event model 401 between the initial state Ss and the final state Sf.

In the behavior pattern model 400, typical pattern models are connected to one another to construct a probabilistic automaton. Not illustrated in FIG. 4, but the connection can be arranged so that the automaton is configured with typical event models and each model has an occurrence probability.

(Typical Event Model)

The behavior pattern model 400 illustrated in FIG. 4 includes typical event models each having a plurality of events, and can be set as a probabilistic automaton having state transitions with probabilities that vary depend on events.

In the following description, each typical event model has an initial state Ss at the beginning and a final state Sf at the end. The states are different from the initial state Ss and the final state Sf in the normal behavior model 400, and correspond to an inbound transition and an outbound transition into and out of a state (square) that represents a typical event model in a normal behavior model.

(Determination of Call Pattern)

The following section is a consideration on a case where it is determined whether a behavior pattern is within a normal behavior pattern or an abnormal behavior pattern based on terminal information about a call on the communication terminal 2. Examples of the typical pattern models for calling are the call starting event model 403 and the mid-call event model 404 in the above behavior pattern model 400. A determination of a call pattern is performed mainly at the pattern determination unit 30 by determining a behavior pattern based on pattern models stored in the pattern model storage unit 20.

(Call Starting Event Model)

Figure 5:
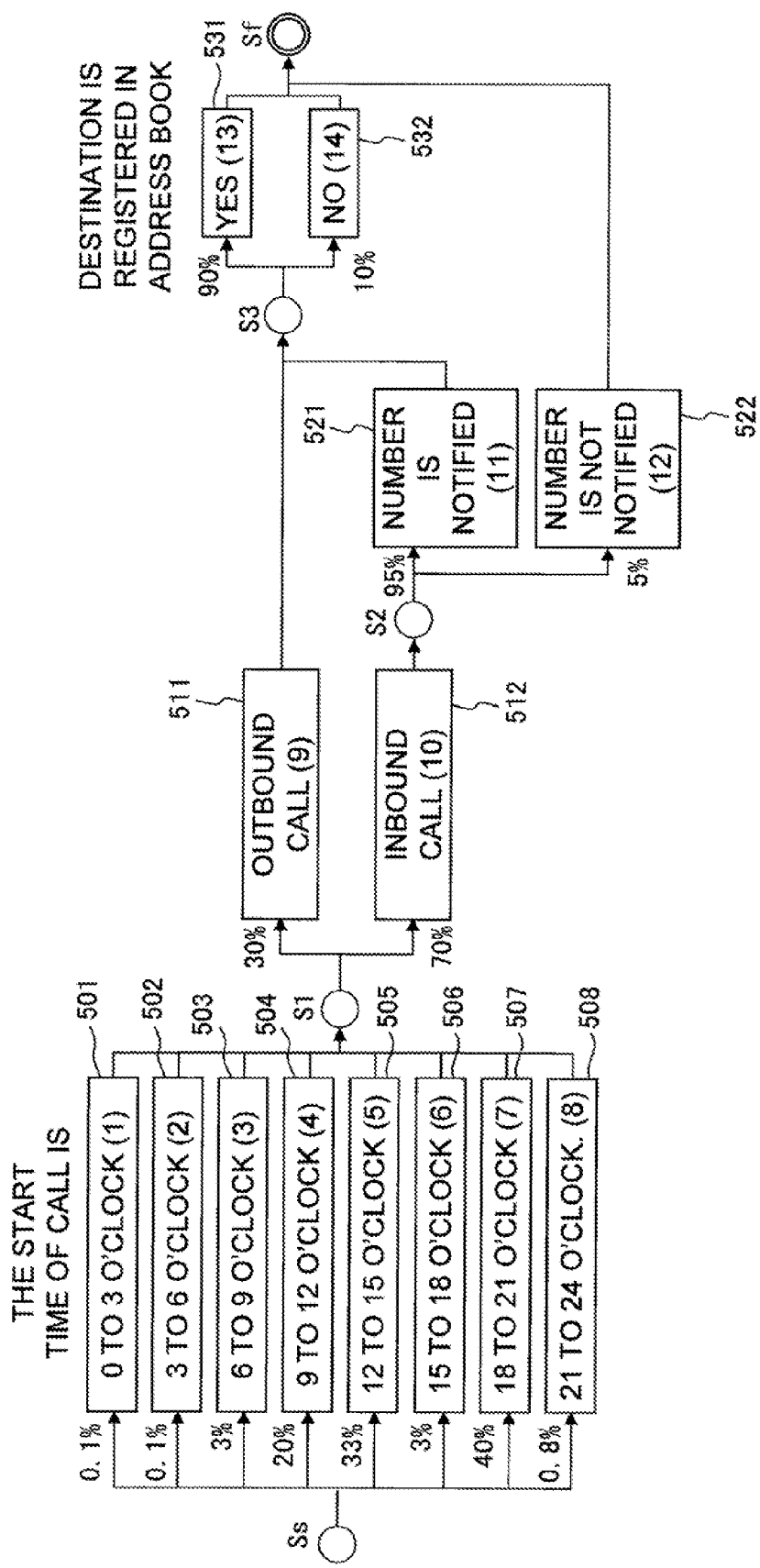
FIG. 5 illustrates an example of an automaton for an event transition.

FIG. 5 illustrates an example of an automaton with events in the call starting event model 403.

The call starting event model 403 includes: first to $8^{th}$ events 501 to 508 relating to time zone when a call starts; a $9^{th}$ event 511 indicating that the communication terminal 2 is the source of the call; a $10^{th}$ event 512 indicating that the communication terminal 2 is the recipient of the call; an $11^{th}$ event 521 indicating the call is from a person whose number is already notified; a $12^{th}$ event 522 indicating the call is from a person whose number is not notified; a $13^{th}$ event 531 indicating that the destination is registered in an address book; and a $14^{th}$ event 532 indicating that the p destination is not registered in the address book.

The first to $8^{th}$ events 501 to 508 each indicate that the start time of a call is within 0 to 3 o'clock, 3 to 6 o'clock, 6 to 9 o'clock, 9 to 12 o'clock, 12 to 15 o'clock, 15 to 18 o'clock, 18 to 21 o'clock, and 21 to 24 o'clock.

The 9th event 511 indicates that the call is to start based on an outbound call from the communication terminal 2.

The 10th event 512 indicates that the call is to start based on an inbound call to the communication terminal 2.

The $11^{th}$ event 521 indicates that the call is to start by a person whose phone number is already notified.

The $12^{th}$ event 522 indicates that the call is to start by a person whose phone number is not notified.

The $13^{th}$ event 531 indicates that the call is to start by a destination that is registered in registered an address book.

The $14^{th}$ event 532 indicates that the call is to start by a destination that is not registered in an address book.

In the example illustrated in FIG. 5, the first to $8^{th}$ events 501 to 508 have an event occurrence probability of 0.1%, 0.1%, 3%, 20%, 33%, 3%, 40%, and 0.8% respectively from the initial state Ss. The $9^{th}$ event 511 and the $10^{th}$ event 512 have an event occurrence probability of 30% and 70% respectively from the first state S1. The $12^{th}$ event 521 and the $13^{th}$ event 522 have an event occurrence probability of 95% and 5% respectively from the second state S2. The $13^{th}$ event 531 and the $14^{th}$ event 532 have an event occurrence probability of 90% and 10% respectively from the third state S3.

The occurrence probability of each event can be set in advance as an expected value when the behavior pattern model 400 is stored in the pattern model storage unit 20. Alternatively, the number of occurrences of each event may be counted by the pattern update unit 50 in FIG. 2 to compute an event occurrence probability and sequentially update the occurrence probability.

The events 501 to 508 between the initial state Ss and the first state S1, and the events 511 and 512 between the first state S1 and the second state S2 occur at the start of a call. Accordingly, the order of these events in an automaton may be changed.

(Mid-Call Event Model)

Figure 6:
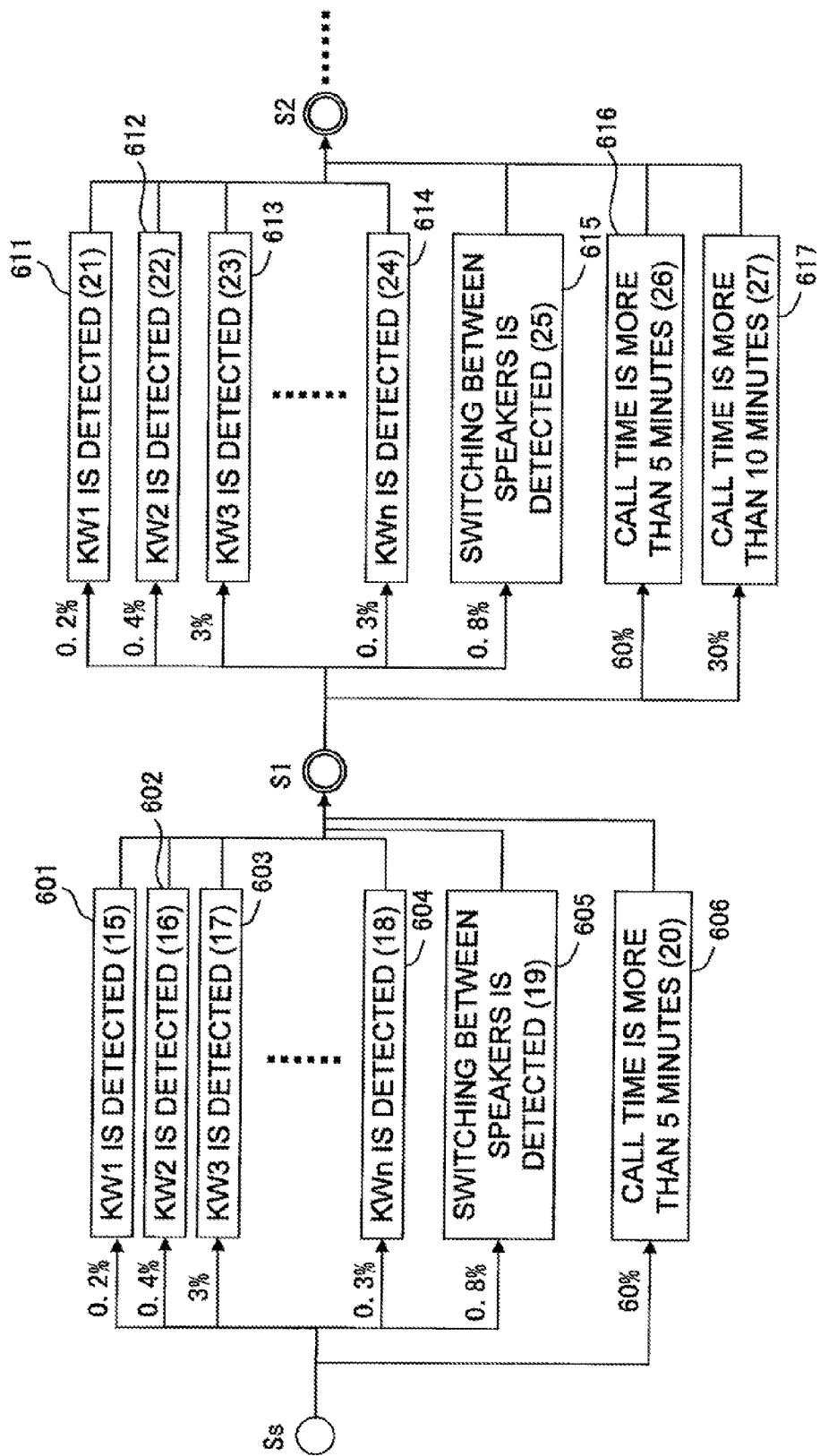
FIG. 6 illustrates an example of an automaton for an event transition.

FIG. 6 illustrates an example of an automaton with events in the mid-call event model 404.

The mid-call event model 404 includes: $15^{th}$ to $18^{th}$ events 601 to 604 indicating that keywords KW1 to KWn are found in contents of a call on the communication terminal 2; a $19^{th}$ event 605 indicating a detection of switching between the speakers of a call; a $20^{th}$ event 606 indicating that more than five minutes have passed since a call started; $21^{st}$ to $24^{th}$ events 611 to 614 indicating that keywords KW1 to KWn are found in contents of a call on the communication terminal 2; a $25^{th}$ event 615 indicating a detection of switching between the speakers of a call; a $26^{th}$ event 616 indicating that more than five minutes have passed since a call started; and a $27^{th}$ event 617 indicating that more than ten minutes have passed since a call started.

The $15^{th}$ to $18^{th}$ events 601 to 604 indicate respectively that there is a predetermined keyword KW1 to KWn in a call, as a result of voice recognition of voice data of the call.

The $19^{th}$ event 605 indicates a detection of switching between the speakers of a call based on the voice data of the source side and the voice data of the recipient side on the communication terminal 2.

The $20^{th}$ event 606 indicates the detection of an elapsed time of more than five minutes after the start of a call on the communication terminal 2.

The 21 to $24^{th}$ events 611 to 614 are similar to the $15^{th}$ to $18^{th}$ events 601 to 604, and indicate respectively that there is a predetermined keyword KW1 to KWn in a call, as a result of voice recognition of voice data of the call.

The $25^{th}$ event 615 is similar to the $19^{th}$ event 605, and indicates a detection of switching between the speakers of a call based on the voice data of the source side and the voice data of the recipient side on the communication terminal 2.

The $26^{th}$ event 616 is similar to the $20^{th}$ event 606, and indicates the detection of an elapsed time of more than five minutes after the start of the call on the communication terminal 2. The $26^{th}$ event 616 resides at the state S1 when five minutes have passed since a call started, in contrast to the $20^{th}$ event 606 that resides at the state Ss when five minutes have passed since a call started. There is no case that goes through both of the $20^{th}$ event 606 and the $26^{th}$ event 616 to reach the state S2.

The 27th event 617 indicates the detection of an elapsed time of more than ten minutes after the start of a call on the communication terminal 2.

The events between the initial state Ss and the first state S1 may be the same as those between the first state S1 and the second state S2. The events arranged at the plural stages facilitate the detection of an abnormal behavior pattern.

In the example illustrated in FIG. 6, the 15th to 20th events 601 to 606 have an event occurrence probability of 0.2%, 0.4%, 3%, 0.3%, 0.8%, 60% respectively from the initial state Ss, and similarly the 21st to 26th events 611 to 616 have an event occurrence probability of 0.2%, 0.4%, 3%, 0.3%, 0.8%, 60% respectively from the first state S1. The 27th event 617 has an event occurrence probability of 30% from the first state S1.

Figure 7:
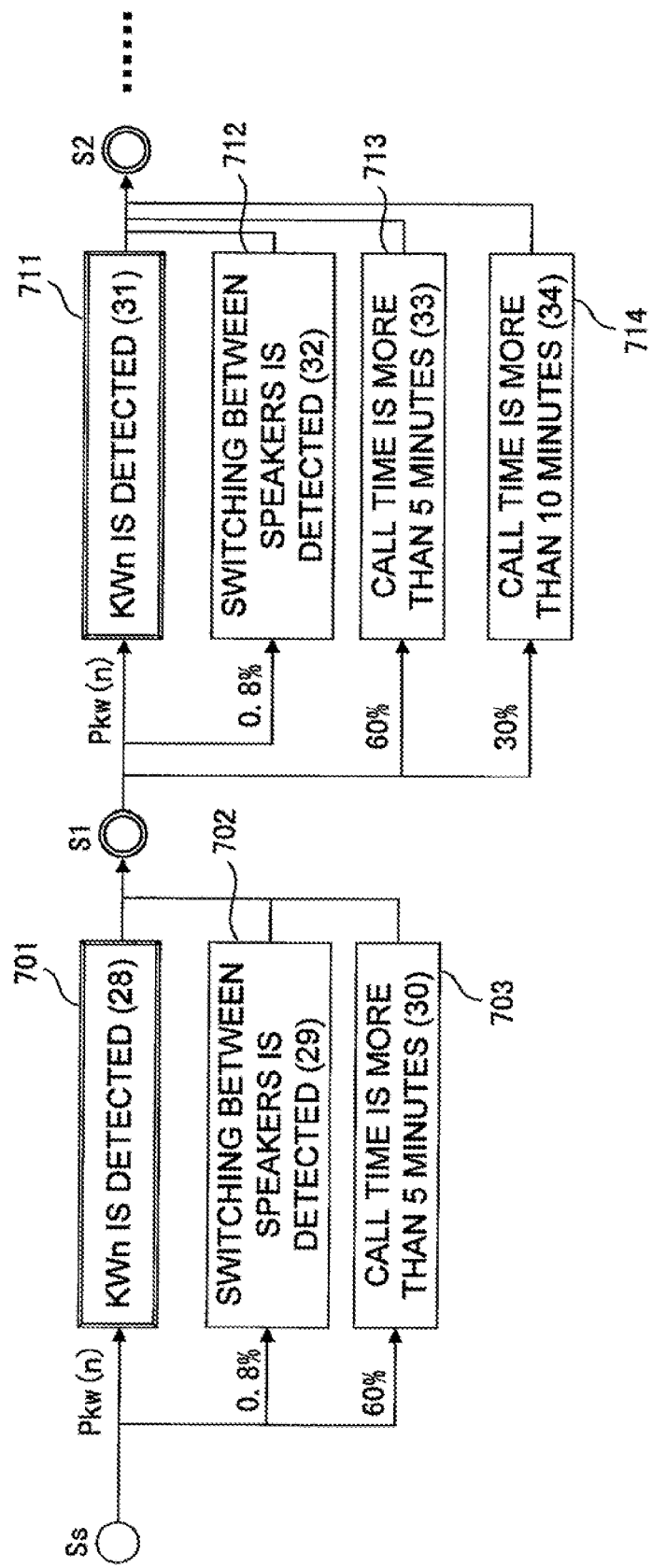
FIG. 7 illustrates an example of an automaton for an event transition.

FIG. 7 illustrates another example of an automaton of with events in the mid-call event model 404.

In the mid-call event model 404 illustrated in FIG. 7, the events of keyword detection are grouped into a 28th event 701 in the state transition from the initial state Ss to the first state S1.

The 28th event 701 indicates detections of the predetermined keywords KW1 to KWn in a call through voice recognition on call voice data on the communication terminal 2. The detection of each of the keywords KW1 to KWn is represented by an event occurrence probability Pkw(n).

The event occurrence probability Pkw(n) at which one of the keywords KW1 to KWn is detected in a call on the communication terminal 2 may be a probability per unit time in the voice data of a call. The probability can be obtained by dividing the number of detection times of each keyword in the past by an accumulated call time.

In the transition between the initial state Ss and the first state S1, there are a 29th event 702 indicating a detection of switching of speakers in a call, and a 30th event 703 indicating more than five minutes have passed since a call started. The 29th event 702 is similar to the 19th event 605 in FIG. 6, and indicates a detection of switching between the speakers of a call based on the voice data of the source side and the voice data of the recipient side on the communication terminal 2. The 30th event 703 is similar to the 20th event in FIG. 6, and indicates the detection of an elapsed time of more than five minutes after the start of a call.

The events of keyword detection are grouped into a 31st event 711 in the state transition from the initial state S1 to the first state S2.

The 31st event 711 is similar to the 28th event 701, and indicates detections of the predetermined keywords KW1 to KWn in a call through voice recognition on call voice data on the communication terminal 2. The detection of each of the keywords KW1 to KWn is represented by an event occurrence probability Pkw(n). The 31st event 711 may use the same event occurrence probability Pkw(n) as that used in the 28th event 701.

In the transition between the first state S1 and the second state S2, in addition to the 31st event 711, there are the 32nd event 712 indicating a detection of switching between the speakers of a call, the 33rd event 713 indicating an elapsed time of more than five minutes after the start of a call, and the 34th event 714 indicating an elapsed time of more than ten minutes after the start of a call on the communication terminal 2.

The 32nd event 712 is similar to the 29th event 702, and indicates a detection of switching between the speakers of a call based on voice data of the source side and the voice data of the recipient side on the communication terminal 2.

The 33rd event 713 is similar to the 30th event 703, and indicates the detection of an elapsed time of more than five minutes after the start of a call on the communication terminal 2.

The 34th event 714 indicates the detection of an elapsed time of more than ten minutes after the start of a call on the communication terminal 2.

In the event of keyword detection, the order of detections of predetermined keywords may be held as an event occurrence probability of the keywords, which is used to determine whether or not a behavior is within a normal behavior pattern.

For example, a probability at which a keyword KWb appears after a keyword KWa is calculated using the information history in the past through voice recognition on calling voice data, which is stored as an event occurrence probability Pkw (a, b). When the keyword KWa is detected at the 28th event 701 in the transition from the initial state Ss to the first state S1, and the keyword KWb is detected at the 31st event 711 in the transition from the first state S1 to the second state S2, the event occurrence probability Pkw (a, b) can be used to compute a probability.

(Normal Behavior Model and Abnormal Behavior Model)

As described above, each event in a behavior pattern model has an event occurrence probability in a state transition. For example, the behavior pattern model 400 illustrated in FIG. 4 goes through a plurality of events in the typical pattern models 401 to 405 from the initial state Ss to the final state Sf. When the model 400 reaches the final state Sf, the pattern determination unit 30 multiplies the event occurrence probabilities of the events with one another to obtain a cumulative probability. The pattern determination unit 30 determines that a higher cumulative probability indicates a higher possibility that the behavior of a user is a normal behavior and that a cumulative probability lower than a predetermined value indicates a higher possibility that the behavior of a user is an abnormal behavior. Therefore, the behavior pattern model 400 can be set as a normal behavior model.

In addition to the normal behavior model, preparation of an abnormal behavior model is required.

An abnormal behavior model is constructed based on a model pattern, among the behavior model patterns stored in the pattern model storage unit 20, the model pattern having a path from an initial state Ss to a final state Sf: the path has a degree of abnormality that is obtained by subtracting a cumulative probability of the events along the path from 100% and is higher than a predetermined value.

Figure 8:
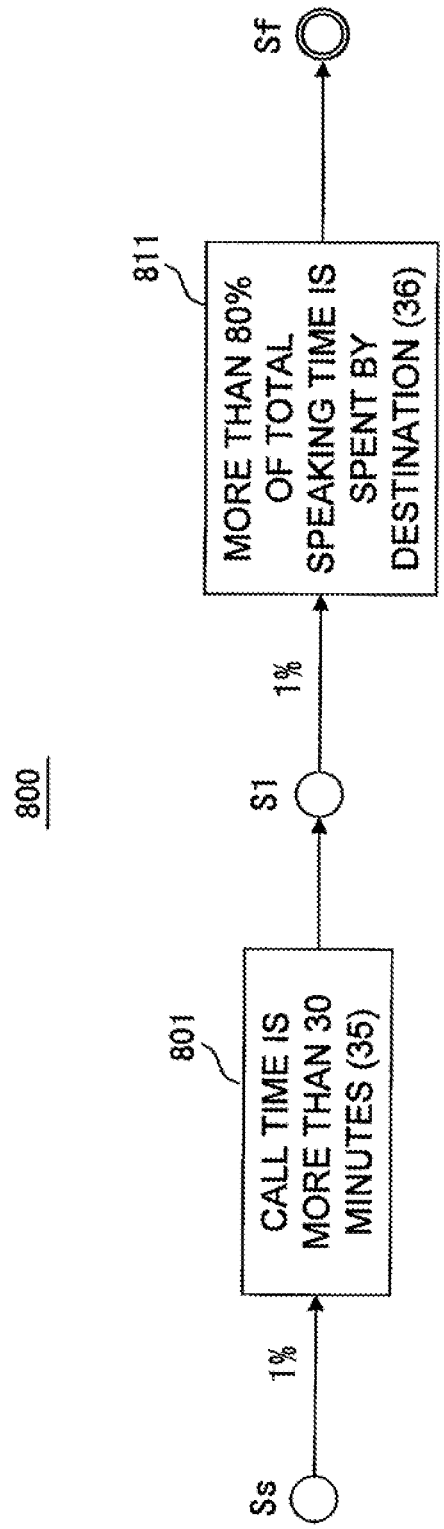
FIG. 8 illustrates an example of an automaton for an event transition.

FIG. 8 illustrates an example of a base behavior pattern for an abnormal behavior model.

The following section is a consideration on a behavior pattern 800 that goes through the 35th event 801 in the transition from the initial state Ss to the first state S1 and the 36th event 811 in the transition from the first state S1 to the second state S2.

The 35th event 801 indicates a call time of more than 30 minutes on the communication terminal 2.

The 36th event 811 indicates a ratio of more than 80% in the speaking time by a person on the other end of the line.

The case where a call time is longer than a predetermined period of time and also a person on the other end of the line speaks the whole time suggests a swindle such as an aggressive solicitation, which is determined to be an abnormal behavior pattern.

In the behavior pattern 800, the 35th event 801 has an event occurrence probability of 1% in the transition from the initial state Ss to the first state S1, and the 36th event 811 has an event occurrence probability of 1% in the transition from the first state S1 to the second state S2.

As a result, the cumulative probability through the 35th event 801 between the initial state Ss and the first transition state S1 and through the 36th event 811 between the first transition state S1 and the final state Sf is 1%×1%=0.01%. The degree of abnormality in the case is 99.98% that is calculated by the subtraction of a value from 100%, the value being obtained by 0.01%×2, that is, multiplying the cumulative probability 0.01% with 2 which is the number of transitions.

If the calculated degree of abnormality is more than a predetermined threshold Tr in a behavior pattern, the behavior pattern is used to construct an abnormal behavior model.

The events in the path from the initial state Ss to the final state Sf are each traced to find a factor that causes the low cumulative probability. For example, an event having an event occurrence probability lower than a predetermined value Ta, an event with multiple choices having an event occurrence probability that is lower than an average event occurrence probability by a predetermined value Tb, or events that are the first m events in ascending order of event occurrence probability and cause the low cumulative probability are specified. The specified events and the order of the events in the transitions are used to construct a probabilistic automaton, which results in an abnormal behavior model.

The resulting abnormal behavior model is stored in the pattern model storage unit 20, so that a degree of abnormality at the communication terminal 2 can be detected based on the abnormal behavior model.

For example, if the process of a call reaches overload on the communication terminal 2, only the abnormal behavior model of a simpler configuration is driven to detect a degree of abnormality based on the abnormal behavior model. In the case, the voice data in a call is recorded, so that, after the call ends, a normal behavior model can be driven to analyze the behavior pattern.

(Communication Terminal)

In the abnormality detection apparatus 1, terminal information is obtained from every unit of the communication terminal 2 to perform an abnormality detecting process. This will be described below in detail with reference to an illustrated example.

Figure 9:
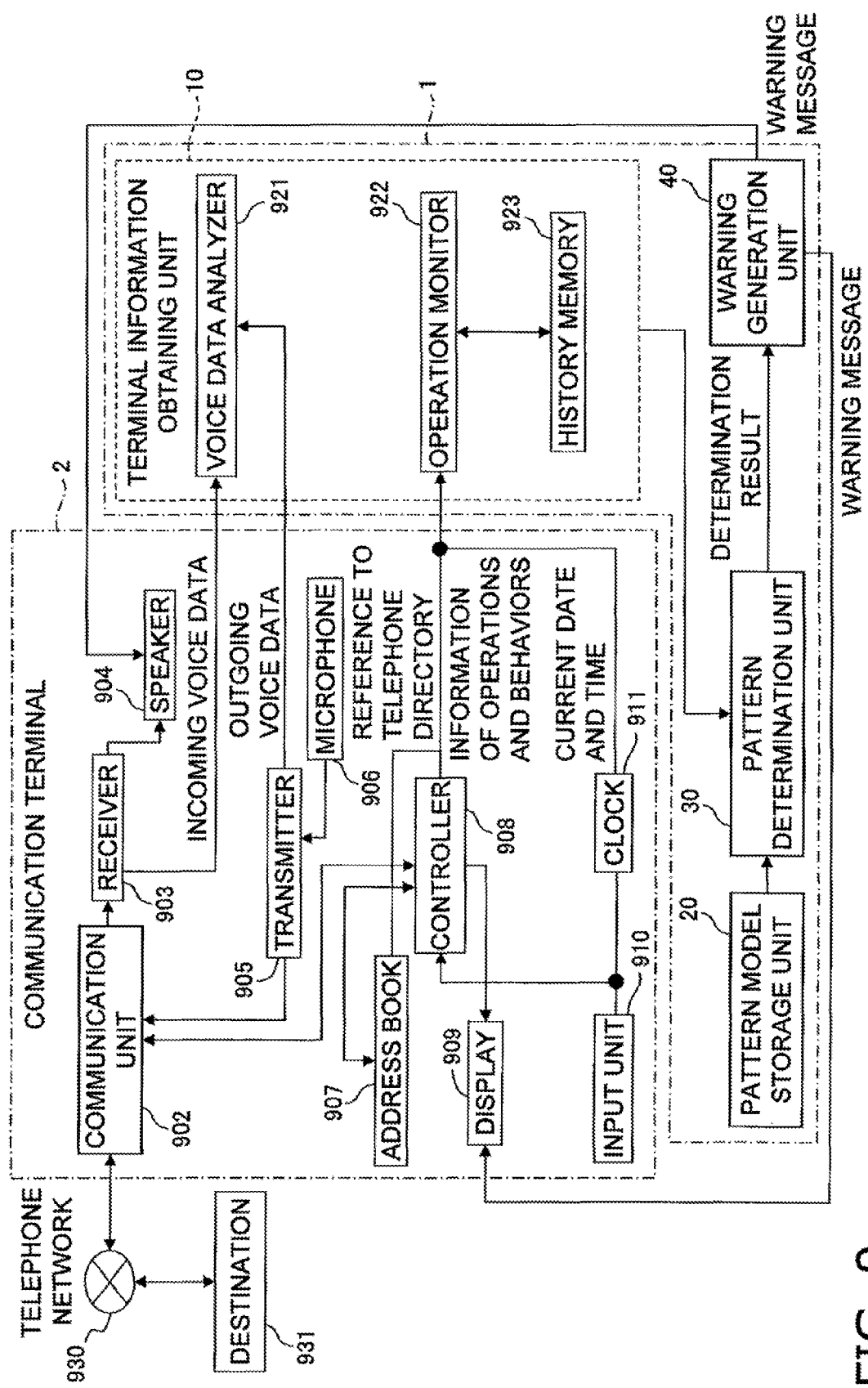
FIG. 9 is a functional block diagram illustrating an embodiment.

FIG. 9 is a functional block diagram illustrating a connection between the abnormality detection apparatus 1 and the communication terminal 2.

As described above, the abnormality detection apparatus 1 may be configured as a module in the communication terminal 2, or may be incorporated in other system on line. Alternatively, only the terminal information obtaining unit 10 may be configured as a module in the communication terminal 2, with the remaining units being in other system on line.

The communication terminal communication 2 includes a communication unit 902, a receiver 903, a speaker 904, a transmitter 905, a microphone 906, an address book 907, a controller 908, a display 909, an input unit 910, and a clock 911.

The communication unit 902 connects the communication terminal 2 to a telephone network 930 for transmission and receipt of voice data to and from the other end of the line 931. The communication unit 902 transmits the voice data from the other end of the line 931 through the telephone network 930 to the receiver 903.

The receiver 903 receives and converts the digital voice data into analog voice data, which is output to the speaker 904.

The transmitter 905 converts the analog voice data of a user captured by the microphone 906 into digital voice data, which is transmitted to the communication unit 902.

The address book 907 includes a memory that stores data of communication partners registered by a user. In the address book 907, phone numbers and names or titles are each stored in association with a memory number. The address book 907 has a function to retrieve data using keys such as the memory numbers, the names or titles, and the phone numbers.

The controller 908 controls every unit of the communication terminal 2, and includes a microprocessor having a CPU, a ROM, and a RAM.

The display 909 displays various information such as an inbound phone number and time information in response to an instruction from the controller 908, and includes a liquid crystal display.

The input unit 910 is used by a user to input information about a destination, to update the address book 907, and to input other information, and includes an operation unit having a numeric keypad, a jog dial, and operation buttons.

The clock 911 maintains the current time, and outputs time information in response to an instruction from the controller 908 for reference.

As described above, the abnormality detection apparatus 1 includes the terminal information obtaining unit 10, the pattern model storage unit 20, the pattern determination unit 30, and the warning generation unit 40.

The terminal information obtaining unit 10 includes a voice data analyzer 921, an operation monitor 922, and a history memory 923.

The voice data analyzer 921 receives inbound voice data from the receiver 903 of the communication terminal 2, and receives outbound voice data from the transmitter 905. The voice data analyzer 921 can be configured to compare a talking period by a caller with that by a recipient for monitoring, based on the received inbound and outbound voice data. The voice data analyzer 921 can be configured to extract a keyword out of inbound and outbound voice data, through voice recognition of the voice data. The keyword analysis may be performed by transmitting the inbound and outbound voice data from the voice data analyzer 921 to the pattern determination unit 30, and extracting keywords are extracted through voice recognition by the pattern determination unit 30.

The operation monitor 922 receives operation information such as information that is input using the input unit 910, a length of a call time, the start time of a call, information of an address book operation history, a destination, and an outbound/inbound call, from the controller 908, the address book 907, and the clock 911.

The operation information received by the operation monitor 922 is stored in a history memory 923 as information of operation history.

The terminal information obtaining unit 10 generates terminal information about calls and operations on the communication terminal 2, such as a length of speaking time, keywords extracted from voice data, a length of a call time, the start time of a call, an address book operation history, destination information, information about it is an outbound/inbound call, and transmits the terminal information to the pattern determination unit 30.

The pattern determination unit 30 determines whether the terminal information from the terminal information obtaining unit 10 is within a normal behavior pattern or an abnormal behavior pattern based on the behavior pattern models stored in the pattern model storage unit 20, and outputs the determination result to the warning generation unit 40. For the determination according to the behavior pattern models, a determination criterion corresponding to each behavior pattern model may be registered in the pattern model storage unit 20 in advance to be used in the determination process.

(Determination of Call Pattern)

Figure 10:
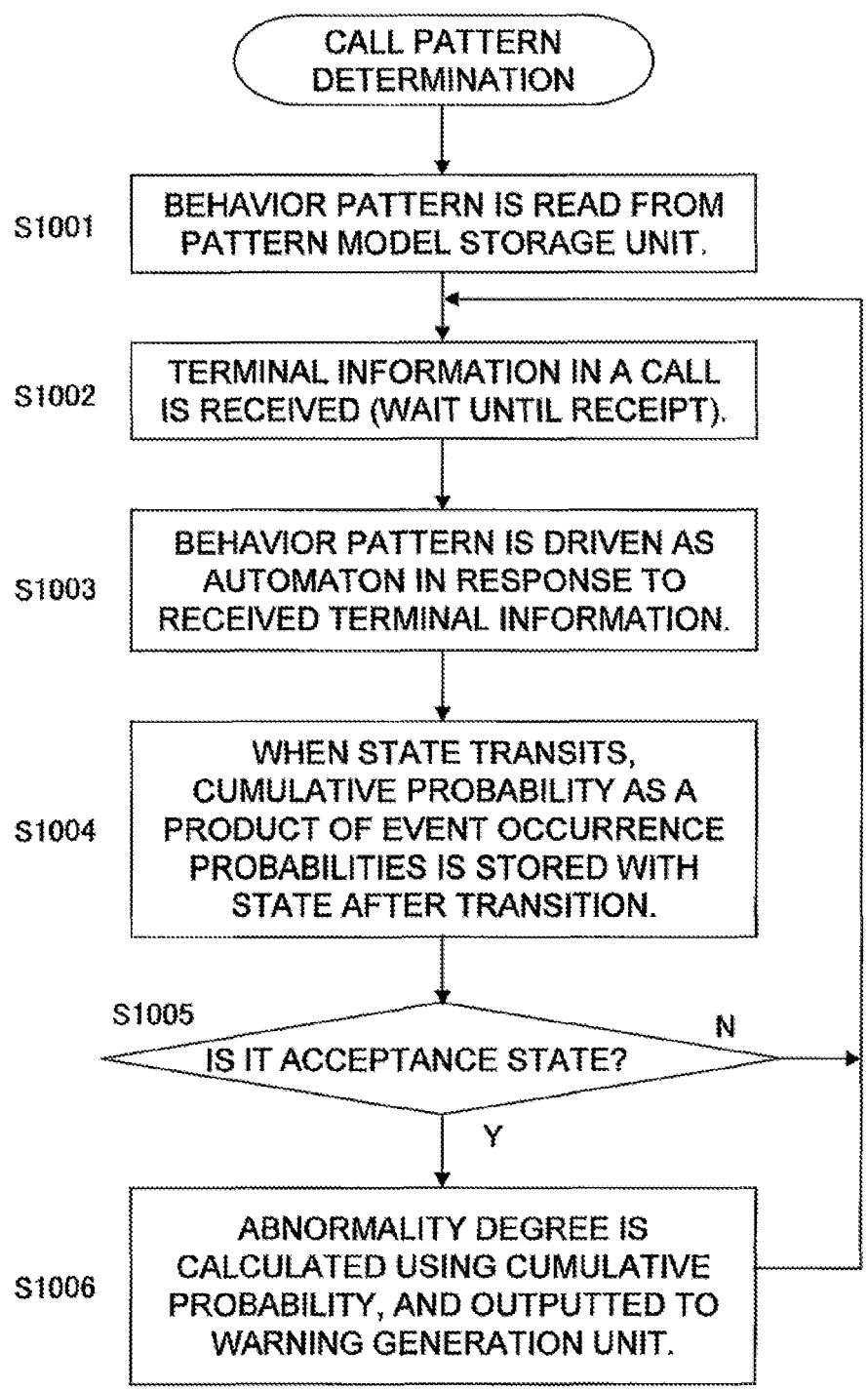
FIG. 10 is a flowchart illustrating a process for determining a call pattern.

FIG. 10 is a flowchart illustrating a call-pattern determination process for determining a behavior pattern in a call.

At step S1001, the pattern determination unit 30 reads out a behavior pattern model in a call in the pattern model storage unit 20. For example, the pattern determination unit 30 selects a behavior pattern model having the main event models such as the past-call event model 402, the call starting event model 403, the mid-call event model 404, and the call ending event model 405 in the behavior pattern model 400 in FIG. 4.

At step S1002, the pattern determination unit 30 waits for and receives the terminal information transmitted from the terminal information obtaining unit 10.

At step S1003, the pattern determination unit 30 drives a behavior pattern model as a probabilistic automaton, in response to the received terminal information.

At step S1004, the pattern determination unit 30 performs state transitions through the behavior pattern model in response to the terminal information, and stores event occurrence probabilities along the path. The pattern determination unit 30 calculates a cumulative probability by multiplying the event occurrence probabilities of the succeeding events with one another, which is stored in a predetermined storage area with the state after transition.

At step S1005, the pattern determination unit 30 determines whether or not a current transition reaches the final state of the behavior pattern model. If the pattern determination unit 30 determines that the transition reaches the final state Sf in the behavior pattern model, the process goes to step S1006: otherwise, the process goes to step S1002.

At step S1006, the pattern determination unit 30 calculates a degree of abnormality of behavior based on the cumulative probability, and outputs warning information to the warning generation unit 40 when the degree of abnormality is more than a predetermined value.

(Determination of Operation Pattern)

Figure 11:
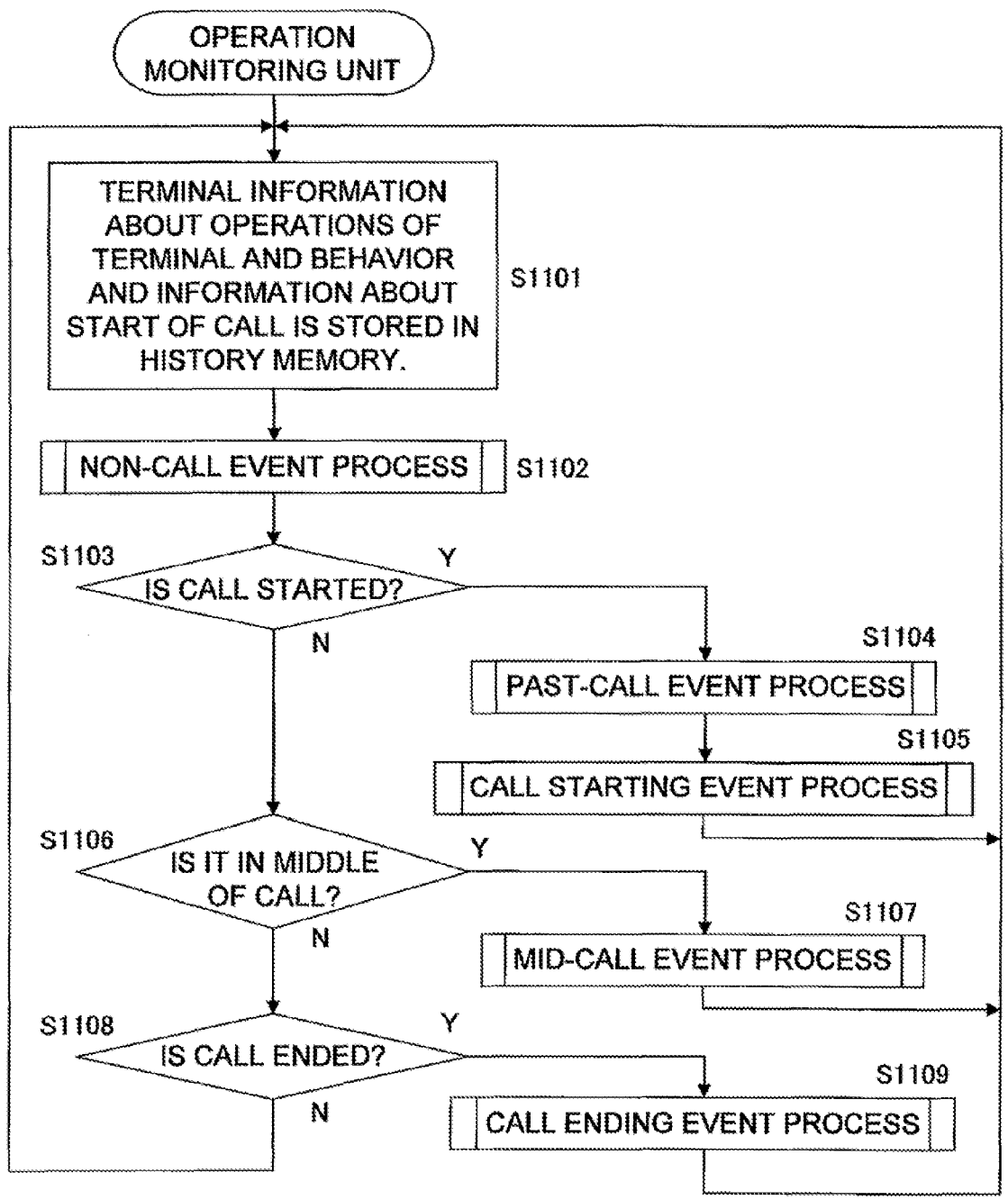
FIG. 11 is a flowchart illustrating an operation monitor.

FIG. 11 is a flowchart illustrating an operation-pattern determination process for determining a behavior pattern based on terminal information about the operations of the communication terminal 2. The operation-pattern determination process may be configured so that the operation monitor 922 makes a determination on an operation pattern based on the terminal information about the operations received from the communication terminal 2, and based on the determination, the pattern determination unit 30 determines whether or not to output warning information.

At step S1101, the terminal information about the operations received by the operation monitor 922 from the controller 908 of the communication terminal 2 is stored in the history memory 923. The terminal information stored in the history memory 923 includes operation information that is input by a user using the input unit 910, an operational mode of the communication terminal 2, a length of a call time, the time a call started, the time a call ended, an address book operation history, information about destination, information about it is an inbound/outbound call. The operation at step S1101 is performed while the communication terminal 2 is not making/receiving a call. Based on the terminal information about the operation, the process goes to step S1102.

At step S1102, the operation monitor 922 performs a non-call event process.

At step S1103, the operation monitor 922 determines whether or not the communication terminal 2 initiated a call. When the operation monitor 922 determines that the communication terminal 2 initiated a call based on the terminal information received from the communication terminal 2, the process goes to step S1104: otherwise, the process goes to step S1106.

At step S1104, the operation monitor 922 performs a past-call event process.

At step S1105, the operation monitor 922 performs a call starting event process.

At step S1106, the operation monitor 922 determines whether or not the communication terminal 2 is currently engaged in a call. When the operation monitor 922 determines that the communication terminal 2 is currently engaged in a call based on the terminal information received from the communication terminal 2, the process goes to step S1107: otherwise, the process goes to step S1108.

At step S1107, the operation monitor 922 performs a mid-call event process.

At step S1108, the operation monitor 922 determines whether or not the communication terminal 2 is disengaged from the call. When the operation monitor 922 determines that the communication terminal 2 is disengaged from the call in the basis of the terminal information received from the communication terminal 2, the process goes to step S1109.

At step S1109, the operation monitor 922 performs a call ending event process.

(Non-Call Event Process)

A non-call event process is performed when the communication terminal 2 is not making/receiving a call, or engaged in a call, but non-call operation is performed on the communication terminal 2.

Figure 12:
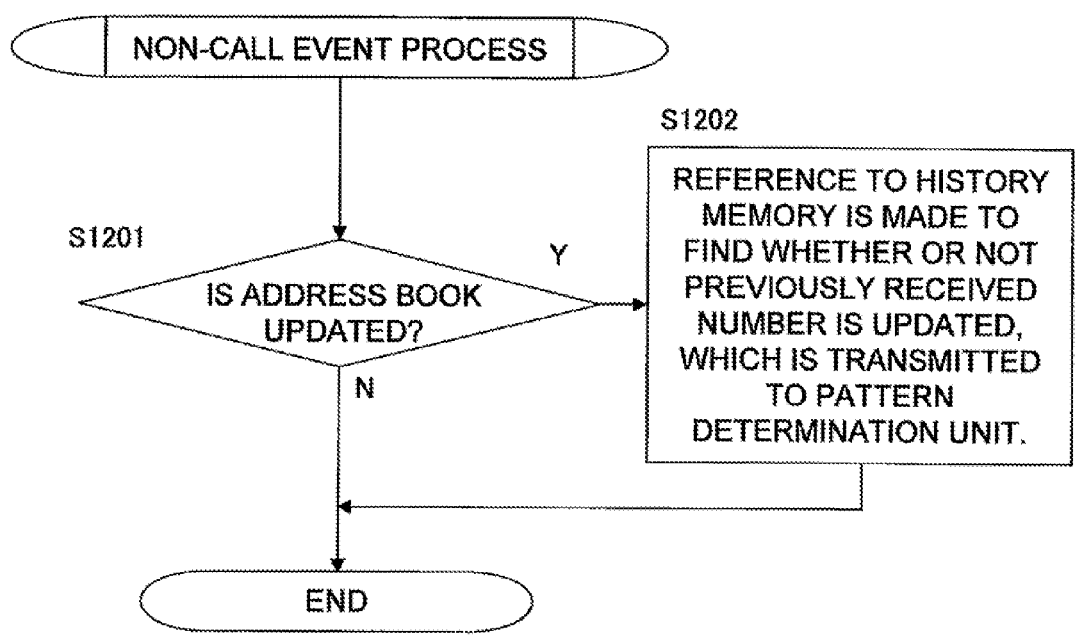
FIG. 12 is a flowchart illustrating a process for non-call events.

FIG. 12 is a flowchart illustrating a non-call event process. The non-call event process may be configured so that the non-call event model 401 in the behavior pattern model 400 in FIG. 4 is driven to determine whether or not a current behavior pattern is a normal behavior pattern or an abnormal behavior pattern.

The non-call event process may include starting up of a game application installed on the terminal, operation of a camera incorporated in the terminal, and setting of an alarm. In the following, updating of an address book for preventing fraud that involves a communication terminal will be described.

At step S1201, the operation monitor 922 determines whether or not there is an update of the address book 907, based on the terminal information received from the communication terminal 2. When the operation monitor 922 determines that there is an update of the address book 907, the process goes to step S1202.

At step S1202, the operation monitor 922 refers to information history stored in the history memory 923 to determine whether or not the update relates to a phone number of a previous call, and outputs the determination result to the pattern determination unit 30. There exists a fraud who changes a phone number in the address book of the communication terminal 2 into his/her own number to pretend to be the person registered in the book. If the update of the address book involves a change of one of the registered phone numbers into the phone number of a previous call, the operation monitor 922 determines that the behavior pattern is not a normal behavior pattern, and outputs the notification to the pattern determination unit 30.

(Past-Call Event Process)

When the communication terminal 2 receives a call or transmits a call, the operation monitor 922 performs a past-call event process before the call is started.

Figure 13:
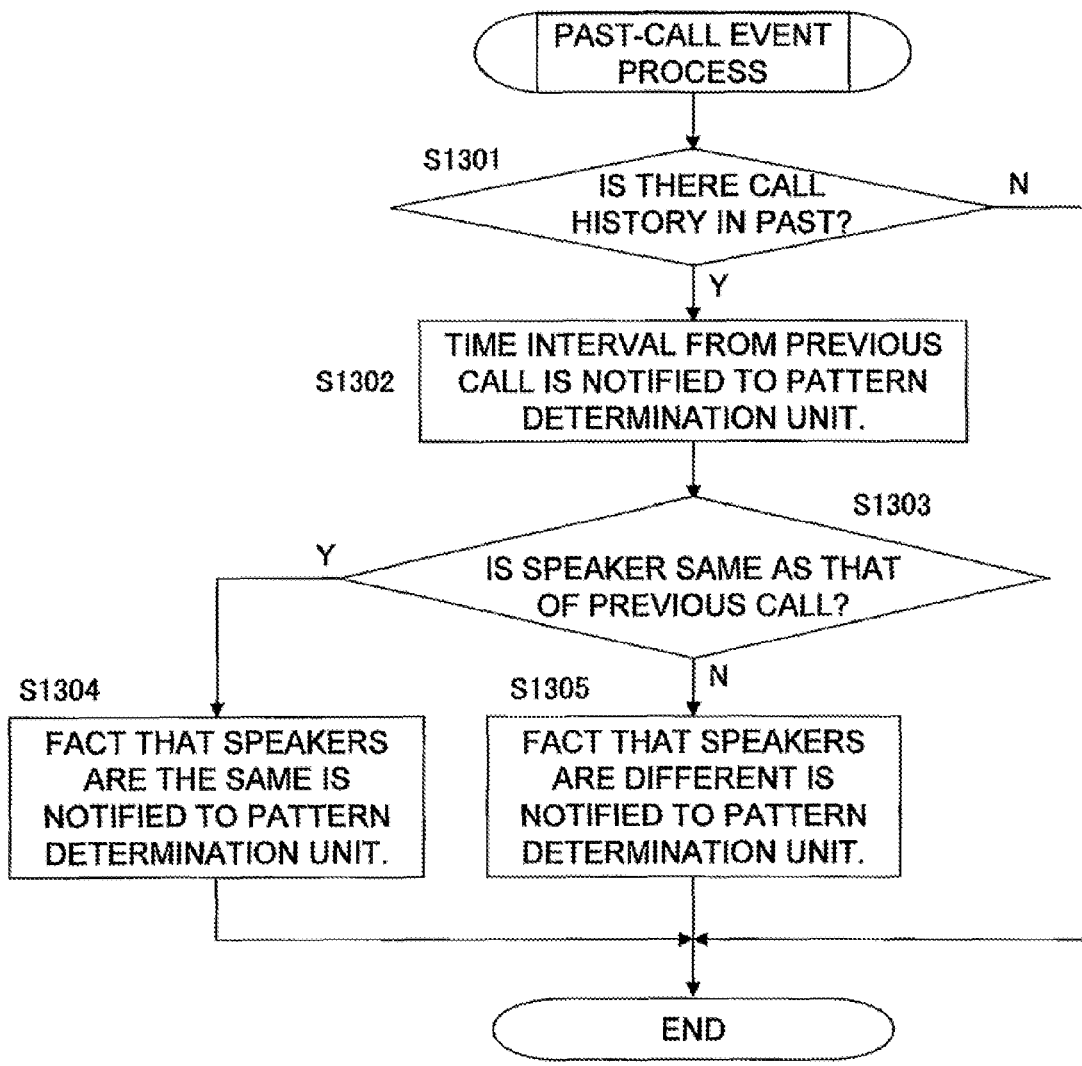
FIG. 13 is a flowchart illustrating a process for past-call events.

FIG. 13 is a flowchart illustrating a past-call event process. The past-call event process may be configured so that the past-call event model 402 in the behavior pattern model 400 in FIG. 4 is driven to determine whether or not a current behavior pattern is a normal behavior pattern or an abnormal behavior pattern.

At step S1301, the operation monitor 922 determines whether or not there is a call history in the past. The operation monitor 922 refers to the history memory 923 to determine whether or not there is a call history in the past. When operation monitor 922 determines that there is a call history in the past, the process goes to step S1302: otherwise, the process ends.

At step S1302, the operation monitor 922 calculates a time interval from a previous call based on the call history information in the history memory 923, and outputs the interval information to the pattern determination unit 30.

At step S1303, the operation monitor 922 determines whether or not the previous destination in the call history information is identical to that of this time. When the operation monitor 922 refers to the information of the address book 907 and determines that the previous determination in the call history information is identical to that of this time, the process goes to step S1304: otherwise, the process goes to step S1305.

At step S1304, the operation monitor 922 transmits a notification concerning the match between the previous destination and the destination of this time, to the pattern determination unit 30.

At step S1305, the operation monitor 922 transmits a notification concerning the mismatch between the previous destination and the destination of this time, to the pattern determination unit 30.

As described above, the operation monitor 922 may be configured to transmit a notification describing that the behavior pattern is not a normal behavior pattern, to the pattern determination unit 30, when detected frequent calls with an identical destination.

(Start-Call Event Process)

When the communication terminal 2 receives or transmits a call, the operation monitor 922 performs a call starting event process.

Figure 14:
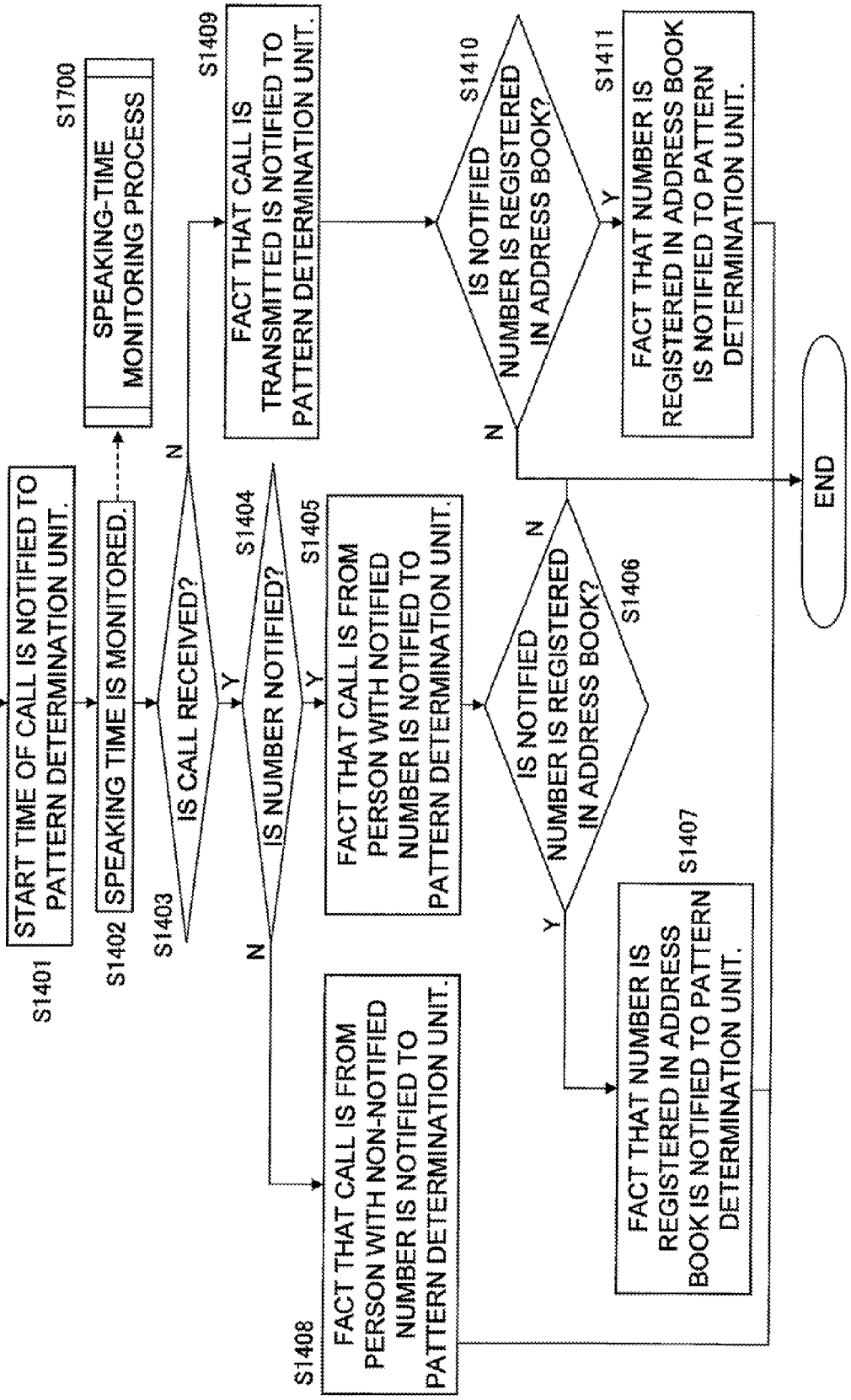
FIG. 14 is a flowchart illustrating a process for call starting events.

FIG. 14 is a flowchart illustrating a call starting event process. The call starting event process may be configured so that the call starting event model 403 in the behavior pattern model 400 in FIG. 4 is driven to determine whether or not a current behavior pattern is a normal behavior pattern or an abnormal behavior pattern.

At step S1401, the operation monitor 922 notifies the start time of the call to the pattern determination unit 30. The operation monitor 922 receives information about the start time of the call from the controller 908 of the communication terminal 2, and transmits the information to the pattern determination unit 30.

At step S1402, the operation monitor 922 starts to monitor a speaking time. The operation monitor 922 causes the voice data analyzer 921 to start to analyze the inbound voice data and the outbound voice data. The voice data analyzer 921 performs a voice analysis speaking-time monitoring process (S1700) in which a ratio between the volumes of the inbound voice data and the outbound voice data in a call is monitored, which is performed in parallel for the two types of data from the start to the end of the call.

At step S1403, the operation monitor 922 determines whether or not the call is an inbound calling received by the communication terminal 2. If the communication terminal 2 is to answer an inbound call, the operation monitor 922 receives a signal indicating the inbound call, from the controller 908 of the communication terminal 2. In this case, the operation monitor 922 determines that the call to be started is an inbound one, and the process goes to step S1404. If the communication terminal 2 is to transmit an outbound call for other destination, the operation monitor 922 receives a signal indicating the transmission, from the controller 908 of the communication terminal 2. In this case, the operation monitor 922 determines that the call to be started is not an inbound one, and the process goes to step S1409.

At step S1404, the operation monitor 922 determines whether or not the destination number is notified. If the call to be started is from a destination whose phone number is notified, the operation monitor 922 receives a signal indicating the notification, from the controller 908 of the communication terminal 2, and determines that the call is a request from a notified destination: and the process goes to step S1405. If the call to be started is from a destination whose phone number is not notified, the operation monitor 922 receives a signal indicating the non-notification, from the controller 908 of the communication terminal 2, and determines that the call is a request from a non-notified destination number: and the process goes to step S1408.

At step S1405, the operation monitor 922 transmits a signal to the pattern determination unit 30, the signal indicating that the call is made from a notified destination number.

At step S1406, the operation monitor 922 determines whether or not the notified destination number is registered in the address book 907. When the operation monitor 922 refers to the telephone number data in the address book 907 of the communication terminal 2, and finds a number in the data that matches with the notified destination number, the operation monitor 922 determines that the notified destination number is registered in the address book. In this case, the process goes to step S1407: otherwise, the process ends.

At step S1407, the operation monitor 922 transmits a signal to the pattern determination unit 30, the signal indicating that the destination who is to start a call has a phone number registered in the address book.

At step S1408, the operation monitor 922 transmits a signal to the pattern determination unit 30, the signal indicating that the call is made from a non-notified destination number.

At step S1409, the operation monitor 922 transmits a signal to the pattern determination unit 30, the signal indicating that the communication terminal 2 is to initiate a call with other destination.

At step S1410, the operation monitor 922 determines whether or not the phone number of the destination is registered in the address book 907. The operation monitor 922 refers to the telephone number data in the address book 907 of the communication terminal 2. If there is a number that matches with the destination number in the address book 907, the operation monitor 922 determines that the phone number of the destination is registered in the address book 907: the process goes to step S1411: otherwise, the process ends.

At step S1411, the operation monitor 922 transmits a signal to the pattern determination unit 30, the signal indicating that the call to be started is from a phone number registered in the address book 907.

(Mid-Call Event Process)

When the communication terminal 2 initiated a call, the operation monitor 922 performs a mid-call event process.

Figure 15:
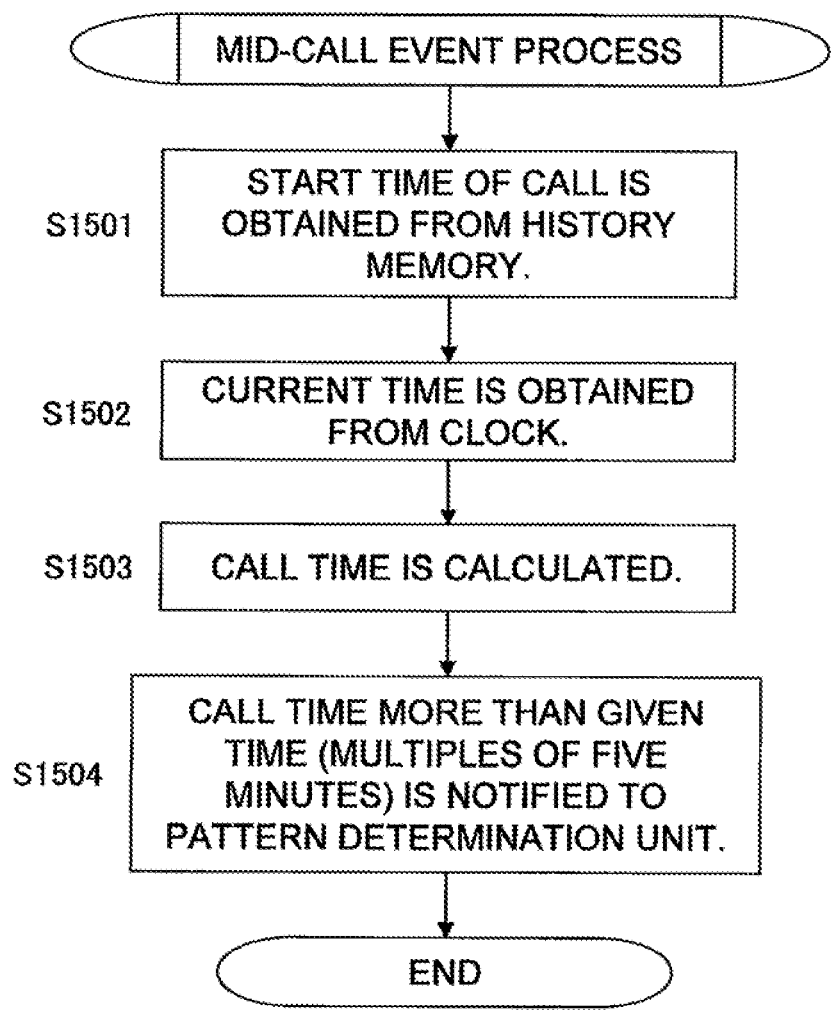
FIG. 15 is a flowchart illustrating a process for mid-call events.

FIG. 15 is a flowchart illustrating a mid-call event process. The mid-call event process may be configured so that the mid-call event model 404 in the behavior pattern model 400 in FIG. 4 is driven to determine whether or not a current behavior pattern is a normal behavior pattern or an abnormal behavior pattern.

At step S1501, the operation monitor 922 obtains information of a start time of the call from the history memory 923. The operation monitor 922 refers to the terminal information about the current call in the history memory 923, and reads out the information about start time of the call.

At step S1502, the operation monitor 922 obtains information of the current time from the clock 911. The operation monitor 922 receives the current time information in the clock 911 from the controller 908 of the communication terminal 2.

At step S1503, the operation monitor 922 calculates the call time at this point of time. The operation monitor 922 obtains the call time by calculating an elapsed time from the start time of the call, based on the information about the start time of the call obtained from the history memory 923 and the current time information received from the controller 908 of the communication terminal 2.

At step S1504, when determined that the call time is longer than one of given times, the operation monitor 922 transmits a notification of the overtime to the pattern determination unit 30. The given times may be multiples of five for example, including 5 minutes, 10 minutes, 15 minutes, and so on, so that the operation monitor 922 may be configured to transmit a notification signal about an elapsed time to the pattern determination unit 30 at every five minutes.

(Call Ending Event Process)

When the communication terminal 2 ends a call, the operation monitor 922 performs a call ending event process.

Figure 16:
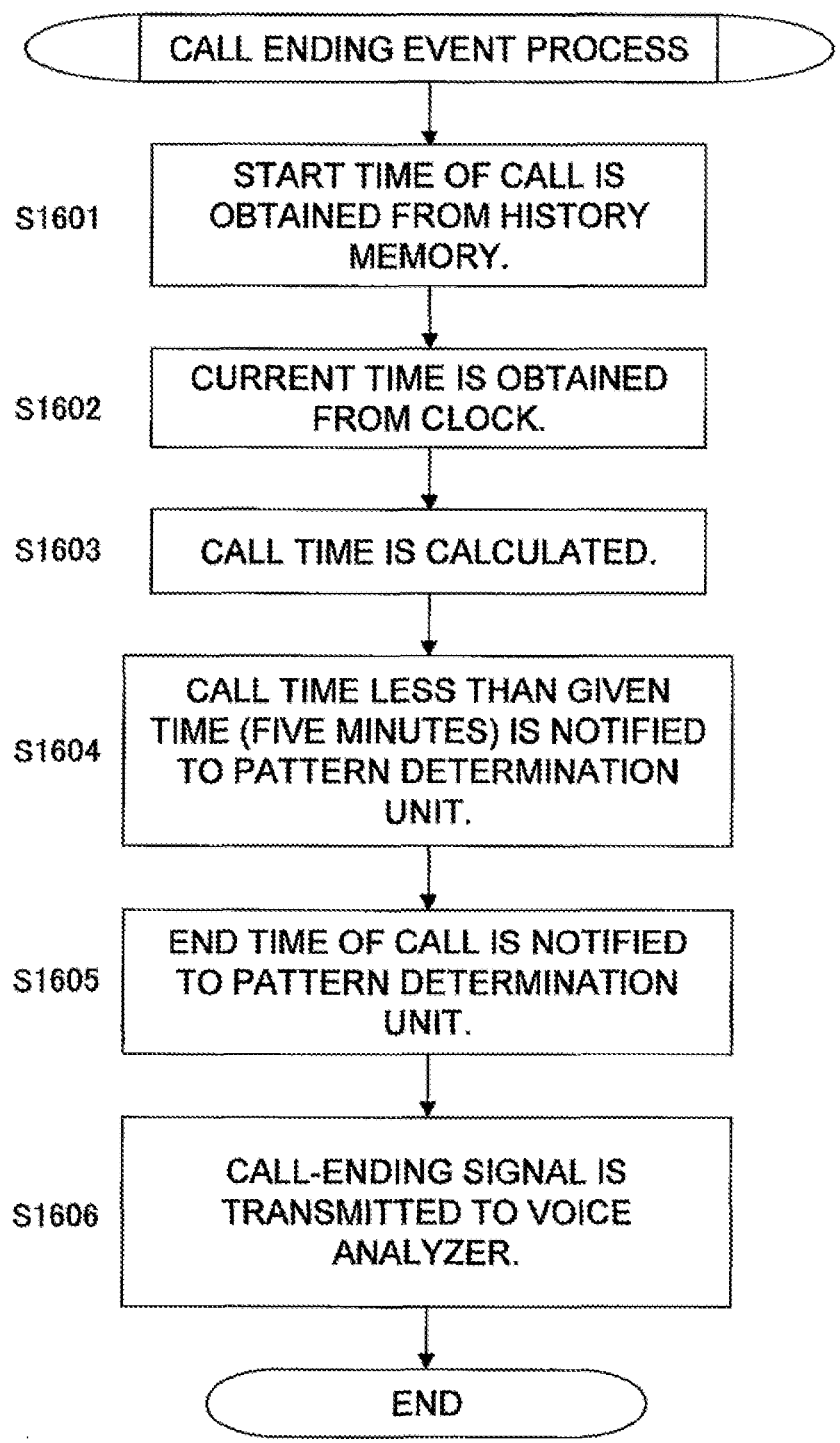
FIG. 16 is a flowchart illustrating a process for call ending events.

FIG. 16 is a flowchart illustrating a call ending event process. The call ending event process may be configured so that the call ending event model 405 in the behavior pattern model 400 in FIG. 4 is driven to determine whether or not a current behavior pattern is a normal behavior pattern or an abnormal behavior pattern.

At step S1601, the operation monitor 922 obtains information of a start time of a call from the history memory 923. The operation monitor 922 refers to the terminal information about the current calling in the history memory 923, and reads out the information of the start time of the call.

At step S1602, the operation monitor 922 obtains information of the current time from the clock 911. The operation monitor 922 receives the current time information in the clock 911 from the controller 908 of the communication terminal 2, which is set to be information of an end time.

At step S1603, the operation monitor 922 calculates the call time. The operation monitor 922 obtains the call time by calculating the period of time between the start time and the end time of the call, based on the information about the start time of the call obtained from the history memory 923 and the end time information received from the controller 908 of the communication terminal 2.

At step S1604, the operation monitor 922 determines whether or not the call time is less than a given time. When determined that the call time is less than a given time, the operation monitor 922 transmits a notification signal indicating the shortness, to the pattern determination unit 30. The given time may be five minutes for example, so that the operation monitor 922 transmits a notification signal indicating the call time was less than five minutes, to the pattern determination unit 30.

At step S1605, the operation monitor 922 transmits the end time of the call to the pattern determination unit 30. The operation monitor 922 already received the end time information from the controller 908 of the communication terminal 2 at the end of the call, and transmits the end time information to the pattern determination unit 30.

At step S1606, the operation monitor 922 transmits a signal indicating the end of the call to the voice data analyzer 921. The voice data analyzer 921, upon the receipt of the signal, ends the speaking-time monitoring process.

(Speaking Time Monitoring Process)

When the communication terminal 2 initiates a call, at the same time, the voice data analyzer 921 starts a speaking-time monitoring process.

Figure 17:
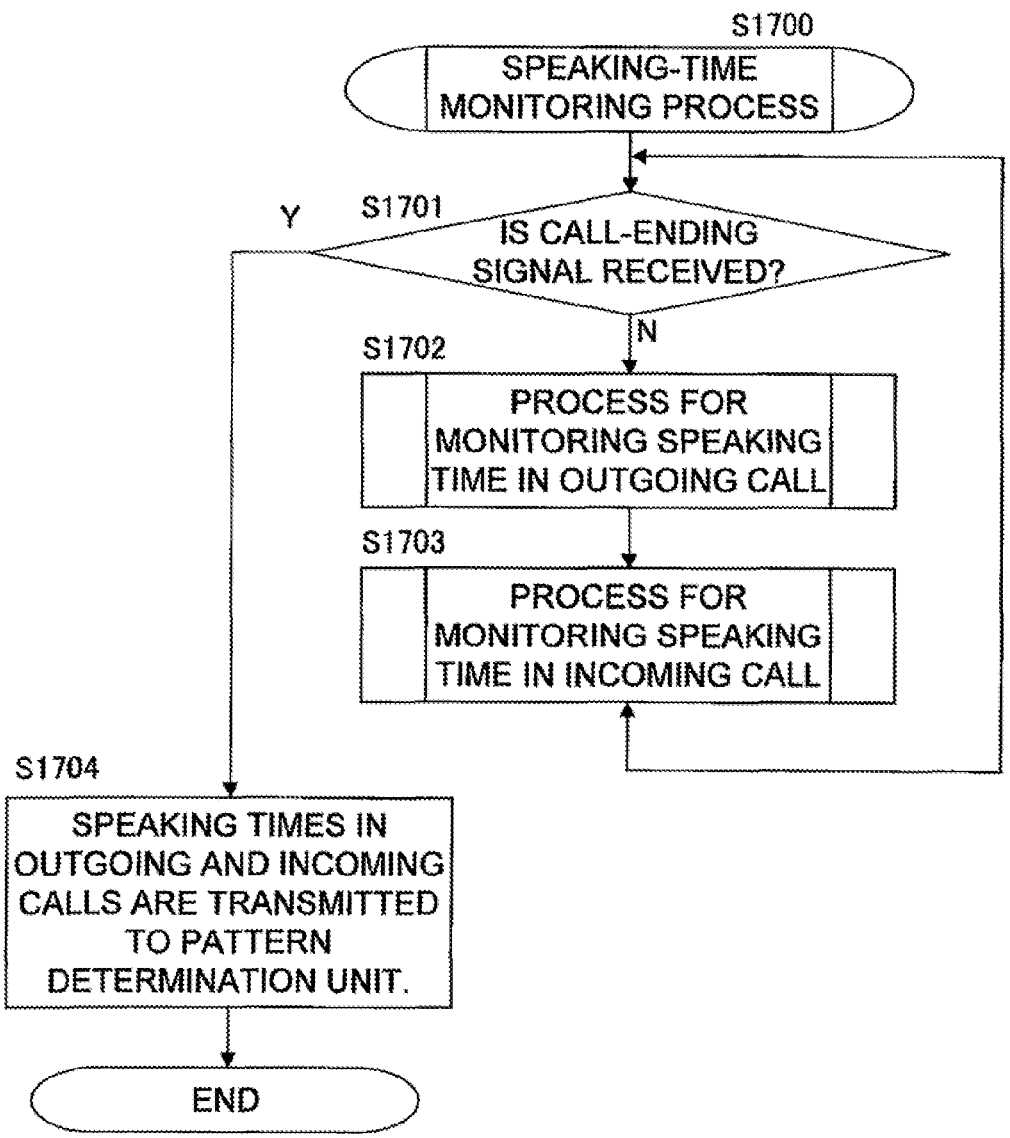
FIG. 17 is a flowchart illustrating a speaking-time monitoring process.

FIG. 17 is a flowchart illustrating a speaking-time monitoring process.

In the speaking-time monitoring process, the time length of inbound voice data in a call is compared to the time length of outbound voice data.

At step S1701, the voice data analyzer 921 determines the presence of receipt of a signal indicating the end of a call. If the voice data analyzer 921 received the signal from the operation monitor 922, the process goes to step S1704: otherwise, the process goes to step S1702.

At step S1702, the voice data analyzer 921 performs a process for monitoring a speaking time in an outbound call.

At step S1703, the voice data analyzer 921 performs a process for monitoring a speaking time in an inbound call.

At step S1704, the voice data analyzer 921 transmits information of the speaking times of the inbound and outbound calls to the pattern determination unit 30.

(Process for Monitoring Speaking Time in Outbound Call and Process for Monitoring Speaking Time in Inbound Call)

A process for monitoring a speaking time in an outbound call and a process for monitoring a speaking time in an inbound call performed by the voice data analyzer 921 will be described. The voice data analyzer 921 calculates the speaking time on the source side in a call, based on the outbound voice data obtained from the transmitter 905 of the communication terminal 2. The voice data analyzer 921 calculates the speaking time on the recipient side in a call, based on the inbound voice data obtained from the receiver 903 of the communication terminal 2. In either process, the voice data is analyzed for calculation of the time length. In the following, only the process for monitoring a speaking time in an outbound call will be described.

Figure 18:
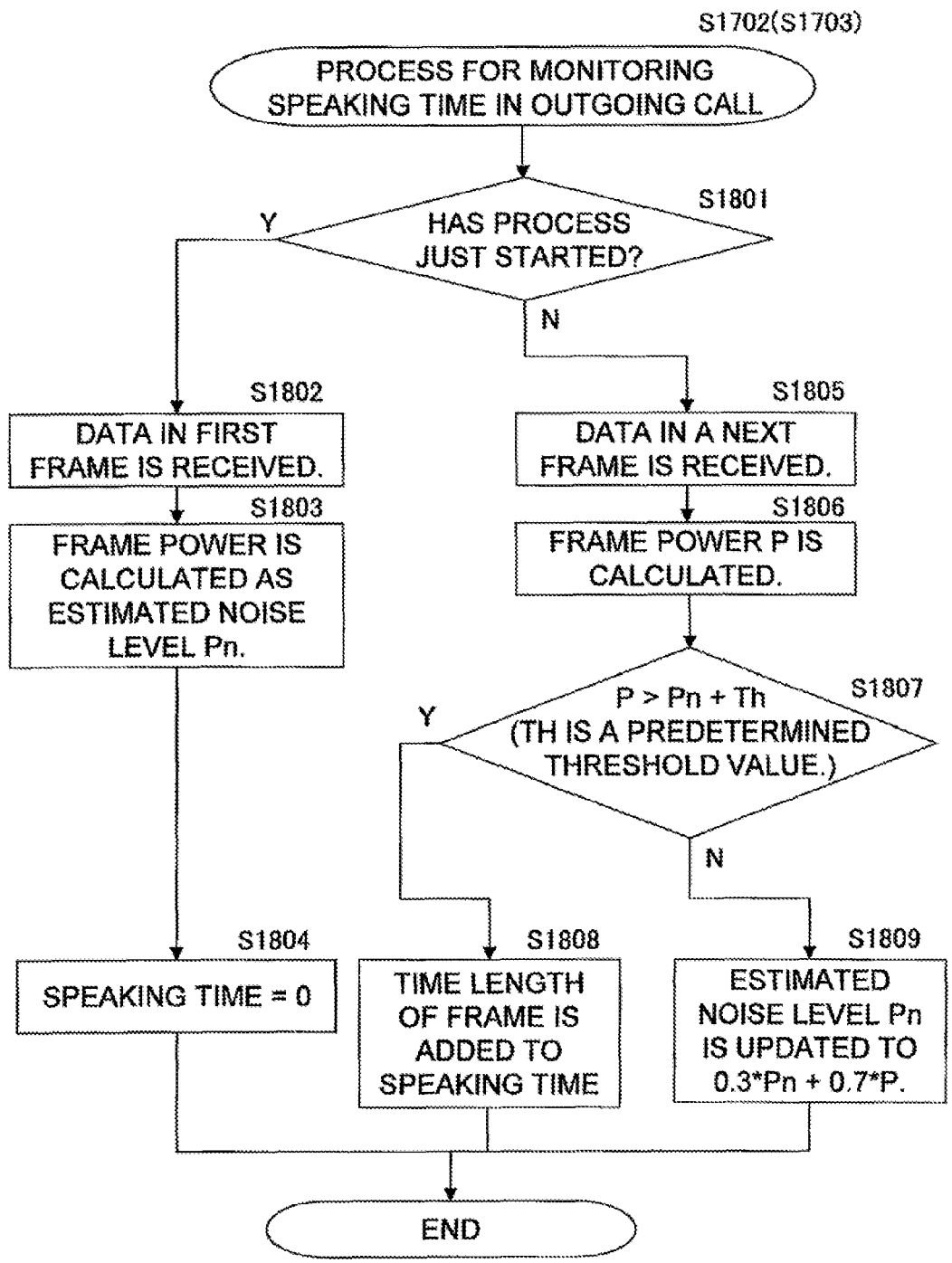
FIG. 18 is a flowchart illustrating a process for monitoring a speaking time in an outbound call.

FIG. 18 is a flowchart illustrating a process for monitoring a speaking time in an outbound call.

At step S1801, the voice data analyzer 921 determines whether or not the process just started. If the voice data analyzer 921 determines that the communication terminal 2 just initiated an outbound call and that the voice data analyzer 921 just received an instruction signal for monitoring a speaking time from the operation monitor 922, the process goes to step S1802: otherwise, the process goes to step S1805.

At step S1802, the voice data analyzer 921 receives data in a first frame. For example, the Wideband Code Division Multiple Access (W-CDMA) system uses 10 ms-width radio frames, in both uplink and downlink, and uses 15 slots per radio frame. Herein, the voice data analyzer 921 receives the voice data in the first frame in the outbound voice data obtained from the transmitter 905.

At step S1803, the voice data analyzer 921 calculates a frame power as an estimated noise level Pn.

At step S1804, the voice data analyzer 921 sets the length of a speaking time on the source side to zero.

At step S1805, the voice data analyzer 921 receives voice data of a next frame.

At step S1806, the voice data analyzer 921 calculates a frame power P. The voice data analyzer 921 calculates the frame power P based on the voice data of the received frame.

At step S1807, the voice data analyzer 921 determines whether or not the frame power P exceeds the addition of the estimated noise level Pn and a predetermined threshold value Ph. When the voice data analyzer 921 determines that the frame power P of a current frame exceeds the addition of the estimated noise level Pn and the predetermined threshold value Ph, the process goes to step S1808: otherwise, the process goes to step S1809.

At step S1808, the voice data analyzer 921 adds the time length of the frame to the speaking time on the source side.

At step S1809, the voice data analyzer 921 updates the estimated noise level to the value obtained according to the equation: 0.3×Pn+0.7×P.

The process for monitoring a speaking time in an outbound is configured as described above, and the voice data analyzer 921 continues the measurement of a speaking time on the source side, until a receipt of an end-call signal from the operation monitor 922.

In the process for monitoring a speaking time in an outbound call, the voice detection process is performed based on the outbound voice data obtained from the transmitter 905, while as in a process for monitoring a speaking time in an inbound call, the voice detection process is performed based on the inbound voice data obtained from the receiver 903.

The process for monitoring a speaking time in an outbound call and the process for monitoring a speaking time in an inbound call are voice activity detections (VAD) in voice data, which may be performed by various advanced methods that have been suggested.

In the case where the communication terminal 2 includes a noise canceller for higher quality and a VAD module for voice compression to reduce communication data volume, the resulting voice detection by VAD process may be used to calculate the call time lengths on the source and recipient sides.

(Warning Generation Unit)

The warning generation unit 40 performs a warning generation process when an abnormal behavior pattern is detected, based on determination result information from the pattern determination unit 30.

Figure 19:
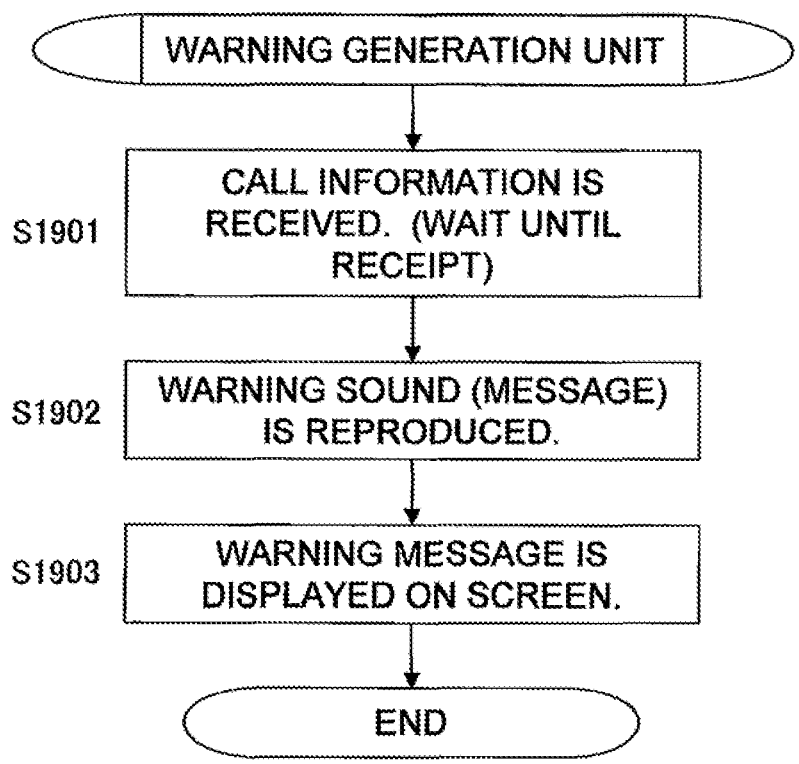
FIG. 19 is a flowchart illustrating a process by a warning generation unit.

FIG. 19 is a flowchart illustrating a warning generation process in the warning generation unit 40.

At step S1901, the warning generation unit 40 waits for and receives determination result information indicating a detection of an abnormal behavior pattern from the pattern determination unit 30.

At step S1902, the warning generation unit 40 generates a warning sound. The warning generation unit 40 may be configured to output an audio report of a detection of abnormal behavior pattern to the speaker 904 of the communication terminal 2. This enables a notification of a detection of abnormal behavior pattern only to a user of the communication terminal 2.

At step S1903, the warning generation unit 40 causes the display 909 to display a warming message. The warning generation unit 40 sends image data that indicates a detection of abnormal behavior pattern to the display 909 of the communication terminal 2 for display.

The warning generation unit 40 may be configured to store, in advance, a warning sound and a warning message indicating a detection of an abnormal behavior pattern for each warning type in a predetermined storage area, so as to select and output an appropriate warning sound or warning message based on a detection result signal from the pattern determination unit 30.

(Examples of Event Model in Process)
(Mid-Calling Event Model)

Figure 20:
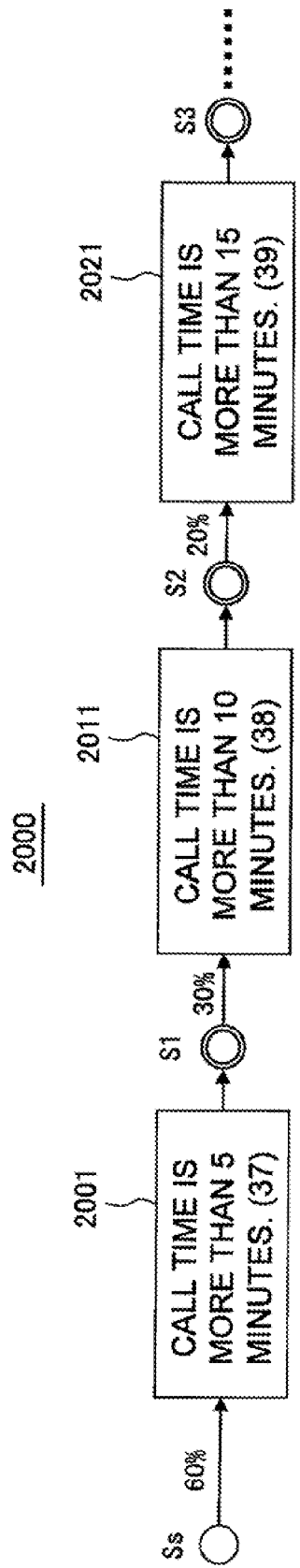
FIG. 20 illustrates an example of an automaton for an event transition.

FIG. 20 illustrates a mid-call event model that corresponds to the mid-call event process in FIG. 16.

The mid-call event model 2000 in FIG. 20 transits from the initial state Ss to the final state Sf (not illustrated) through the first state S1, the second state S2, the third state S3, and so on.

In the transition from the initial state Ss to the first state S1, the mid-call event model 2000 goes through a $37^{th}$ event 2001 for a time length of a call of more than five minutes. The $37^{th}$ event 2001 has an event occurrence probability of 60%.

In the transition from the first state S1 to the second state S2, the mid-call event model 2000 goes through a $38^{th}$ event 2011 for a time length of a call of more than ten minutes. The $38^{th}$ event 2011 has an event occurrence probability of 30%.

In the transition from the second state S2 to the third state S3, the mid-call event model 2000 goes through a $39^{th}$ event 2021 for a time length of a call of more than 15 minutes. The $39^{th}$ event 2021 has an event occurrence probability of 20%.

In the above mid-call event model 2000, since the probability for a time length of a call of more than five minutes is 60% and the probability for a time length of a call of more than ten minutes is 30%, the cumulative probability for a time length of a call of more than ten minutes is 60%×30%=18%.

In the mid-call event model 2000, because a longer time length of a call results in a smaller cumulative probability, when the cumulative probability reaches a predetermined value, the further transitions may be eliminated before the final state Sf.

The mid-calling event process may be eliminated in the case without a warning process during a call. In this case, a process for a time length of a call is performed only in the call ending event.

(Call Ending Event Model)

Figure 21:
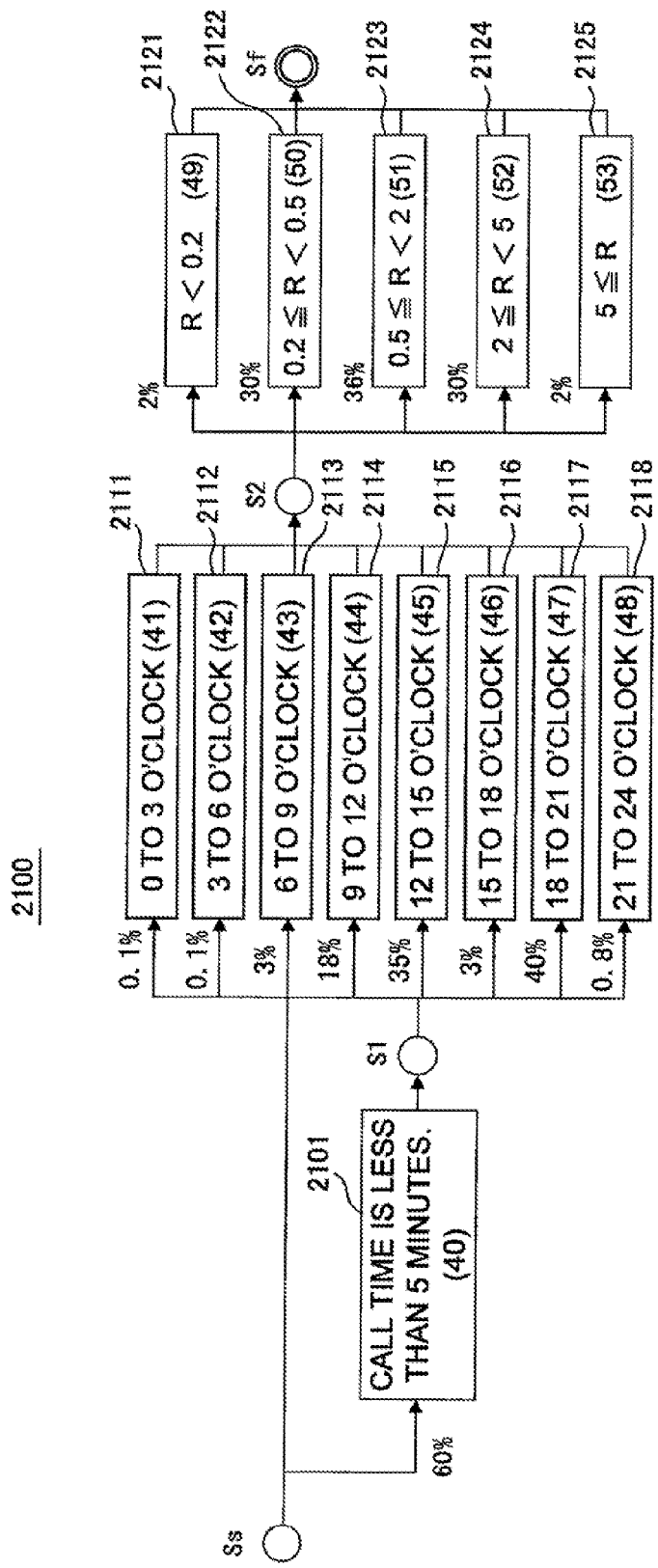
FIG. 21 illustrates an example of an automaton for an event transition.

FIG. 21 illustrates an example of a call ending event model that corresponds to the process of a call ending event in FIG. 16.

The call ending event model 2100 illustrated in FIG. 21 transits from the initial state Ss to the final state Sf through the first state S1 and the second state S2.

The call ending event model 2100 transits from the initial state Ss to the first state S1 through a $40^{th}$ event 2101 that indicates a time length of a call of less than five minutes.

In the process of a mid-call event using the above described mid-call event model 2000, a cumulative probability is already multiplied with a probability of the event for a time length of a call of more than five minutes. Accordingly, in the case where a time length of a call is more than five minutes, the behavior pattern goes through an event for an end time of a call that has an event occurrence probability of 100%. In the case where the mid-call event model 2000 goes through the $40^{th}$ event 2101 for a time length of a call of less than five minutes, the event occurrence probability is 60%.

The event for an end time of a call includes a $41^{st}$ event 2111 indicating that the end time of a call is between 0 to 3 o'clock, a $42^{nd}$ event 2112 indicating that the end time of a call is between 3 to 6 o'clock, a $43^{rd}$ event 2113 indicating that the end time of a call is between 6 to 9 o'clock, a $44^{th}$ event 2114 indicating that the end time of a call is between 9 to 12 o'clock, a $45^{th}$ event 2115 indicating that the end time of a call is between 12 to 15 o'clock, a $46^{th}$ event 2116 indicating that the end time of a call is between 15 to 18 o'clock, a $47^{th}$ event 2117 indicating that the end time of a call is between 18 to 21 o'clock, and a $48^{th}$ event 2118 indicating that the end time of a call is between 21 to 24 o'clock. The $41^{st}$ to $48^{th}$ events 2111 to 2118 have an event occurrence probability of 0.1%, 0.1%, 3%, 18%, 35%, 3%, 40%, and 0.8%, respectively.

In the path between the second state S2 to the final state Sf, the mid-call event model 2000 goes through an event for a speaking time. The event for a speaking time branches into the $49^{th}$ event 2121 to $53^{rd}$ event 2125 depending on a ratio of speaking time R=speaking time on the source side/speaking time on the recipient side.

The 49th to 53rd event 2121 to 2125 indicate to have a speaking time ratio R of less than 0.2, from 0.2 to less than 0.5, from 0.5 to less than 2, from 2 to less than 5, and 5 or more, respectively.

The 49th to 53rd event 2121 to 2125 have an event occurrence probability of 2%, 30%, 36%, 30%, and 2%, respectively.

(Non-Call Event Model)

Figure 22:
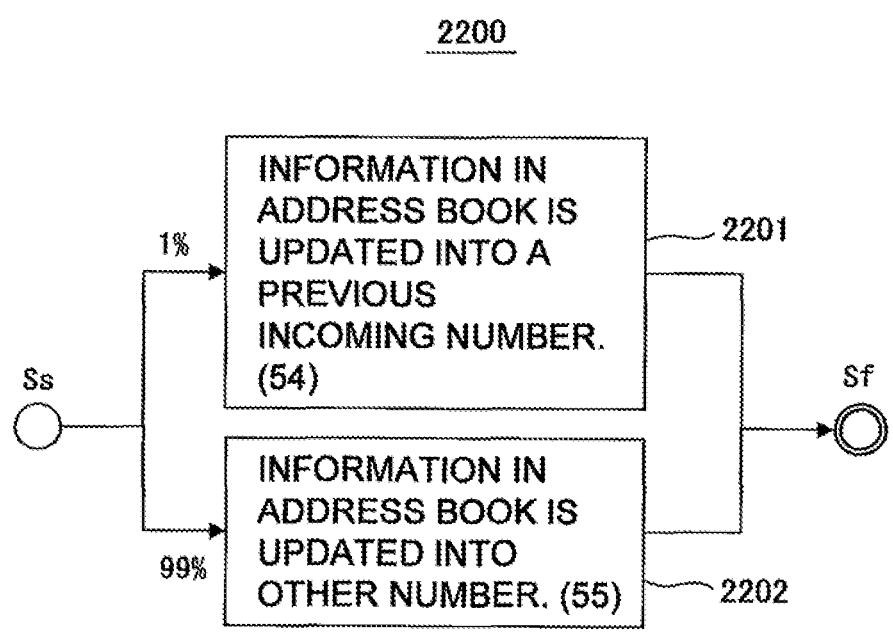
FIG. 22 illustrates an example of an automaton for an event transition.

FIG. 22 illustrates an example of a non-call event model that corresponds to the non-call event process in FIG. 12.

The non-call event model 2200 has a 54th event 2201 and a 55th event 2202 between the initial state Ss and the final state Sf.

The 54th event 2201 occurs when the address book 907 is updated for the phone number of a destination of a previous call. The 54th event 2201 has an event occurrence probability of 1%.

The 55th event 2202 occurs when the address book 907 is updated for the phone number other than that of a destination of a previous call. The 55th event 2202 has an event occurrence probability of 99%.

(Past-Call Event Model)

Figure 23:
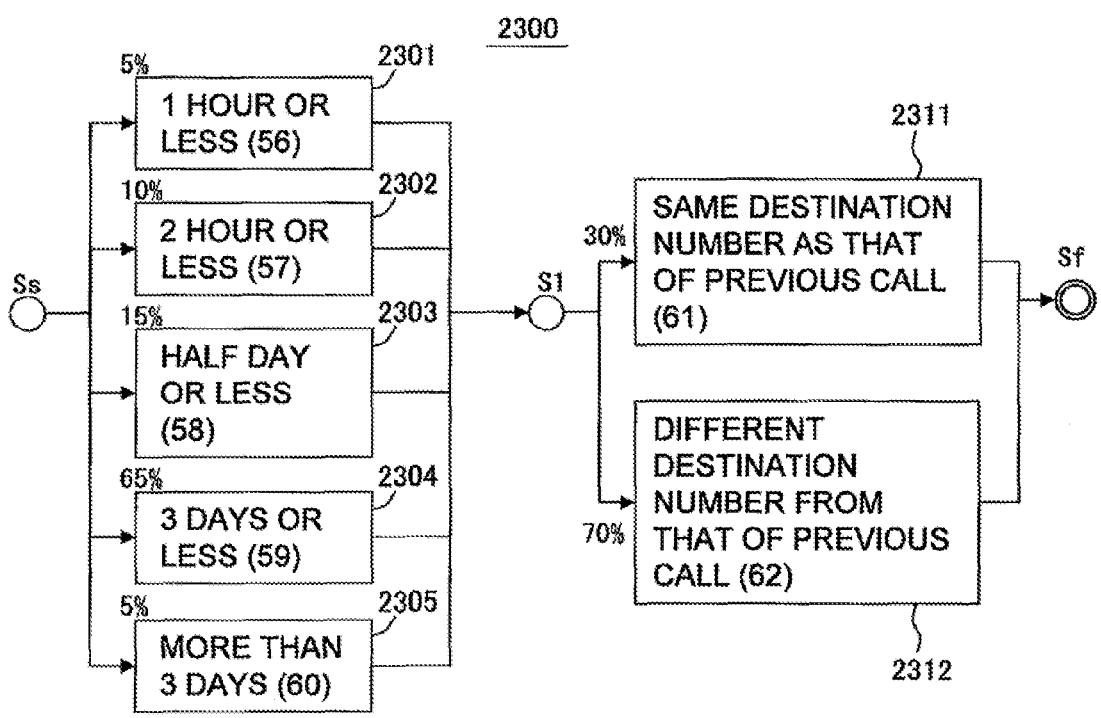

FIG. 23 illustrates an example of a past-call event model that corresponds to the past-call event process in FIG. 13.

The past-call event model 2300 has 56th to 60th events 2301 to 2305 in the transition between the initial state Ss and the first state S1, the events each indicating a time interval from a previous call.

In the transition between the first state S1 and the final state Sf, there are a 61st event 2311 and a 62nd event 2312.

The 56th event 2301 to 60th event 2305 respectively indicate a time interval from a previous call of one hour or less, two hours or less, a half day or less, three days of less, and more than three days, and respectively have an event occurrence probability of 5%, 10%, 15%, 65%, and 5%.

The 61st event 2311 occurs when a current call destination has the same phone number as that of a previous call destination, and has an event transition probability of 30%.

The 62nd event 2312 occurs when a current call destination has a different phone number from that of the previous call destination, and has an event transition probability of 70%.

(Example of Detection of Abnormality)

An actual detection of an abnormality described in the above example will be described.

The communication terminal 2 having the every functional unit installed thereto is a cell-phone terminal having an operating system (OS) that supports multi-task (process), and provides an abnormality detection method using event driven programming. The terminal may use multi-threading, single-tasking, or single-threading OS.

The pattern determination unit 30, the operation monitor 922, and the warning generation unit 40 are activated independently as separate tasks at the start up of the communication terminal 2.

The speaking-time monitoring process by the voice data analyzer 921 is started as a separate task at the start of a call, and ends at the end of the call.

The delivery of signals between the tasks can be achieved, similar to a typical multi-task programming, by writing into a shared memory area by the signal transmitter side and regular access to the shared memory area by the signal receiver side.

In the above example, when the communication terminal 2 is turned on, the pattern determination unit 30 and the operation monitor 922 respectively perform a call pattern determination process in FIG. 10 and the operation monitoring process in FIG. 11, in parallel.

An example of a possible dangerous call is now used to describe a method of detection thereof. As described above, a degree of abnormality is calculated by the equation: 100%−cumulative probability×number of transitions.

Figure 24:
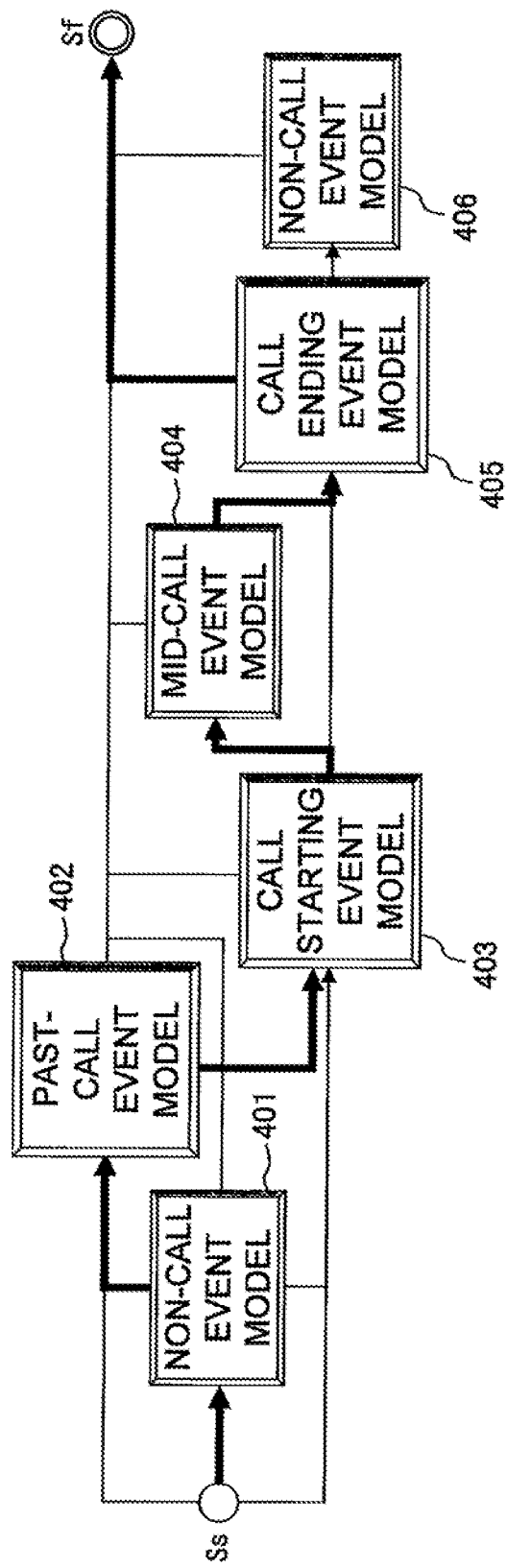
FIG. 24 illustrates an example of an automaton for an event model transition.

FIG. 24 illustrates an example of the transition process in the behavior pattern model 400 in FIG. 4.

For example, a consideration is given to a case where data in an address book is updated just before a call starts, and the call comes in from the same phone number as the updated data: in this case, the behavior pattern goes through the non-call event model 401, the past-call event model 402, the call starting event model 403, the mid-call event model 404, and the call ending event model 405 between the initial state Ss and the final state Sf.

Assume that a person pretends to be a son of a user of the communication terminal 2 and makes a call on the communication terminal 2, saying "I lost my cell-phone. Could you update your address book with the number of this call?" If the user updates the address book of the communication terminal 2 as requested on the call, the non-calling event process in FIG. 12 is performed. At this point of time, as step S1202, the operation monitor 922 detects the change of the data of the address book into a phone number of a previous call. The information about the change is transmitted to the pattern determination unit 30.

The pattern determination unit 30 refers to the non-call event model 401, the past-call event model 402, and the call starting event model 403 as candidates to transit from the initial state Ss. The pattern determination unit 30 chooses the non-call event model 401.

In the non-call event model 2200 in FIG. 22, the pattern determination unit 30 transits from the initial state Ss to the final state Sf through the 54th event 2201. In this case, the cumulative probability is equal to the cumulative probability of the 54th event 2201, that is, 1%. The pattern determination unit 30 uses the cumulative probability and calculates a degree of abnormality=100%−1%×1=99%, which is transmitted to the warning generation unit 40.

If, the next day, the user receives an inbound call from the updated phone number in the address book, the call is assumed to be made by the same person.

In this case, in the past-call event process in FIG. 13, the operation monitor 922 detects that the inbound call is made within three days after the previous call and that the destination is the same as that who called previously, and transmits a signal indicating the detections to the pattern determination unit 30.

The pattern determination unit 30 refers to the past-call event model 402 and the call starting event model 403 as candidates to transit from the non-call event model 401 in the behavior pattern model 400 in FIG. 24. The pattern determination unit 30 chooses the past-call event model 402.

The pattern determination unit 30 refers to the past-call event model 2300 in FIG. 23, and can transit to the final state Sf through the 59th event 2304 and the 61st event 2311, based on the terminal information received from the operation monitor 922. The pattern determination unit 30 calculates the cumulative probability at this point of time using the cumulative probability of the non-call event model 2200 according to the equation: 1%×65%×30%=0.195%. Based on the cumulative probability, the pattern determination unit 30 calculates a degree of abnormality=100%−0.195%×3=99.415%, which is transmitted to the warning generation unit 40.

If the call comes into the communication terminal 2 at the time 14:10, in the call starting event process in FIG. 14, the operation monitor 922 obtains terminal information such as the start time of the call, the fact of notification of the number, and the fact of registration of the number into address book, which is transmitted to the pattern determination unit 30.

The pattern determination unit 30 refers to the call starting event model 403 as a candidate to transit from the current position, that is, the past-call event model 402 in FIG. 4.

In the call starting event model in FIG. 5, the pattern determination unit 30 can transit to the final state Sf through the $5^{th}$ event 505, the $10^{th}$ event 512, the $11^{th}$ event 521, and the $13^{th}$ event 531. The pattern determination unit 30 calculates a cumulative probability at this point of time using the cumulative probability of the event models according to the equation: 0.195%×33%×70%×95%×90%=0.0385%. Based on the cumulative probability, the pattern determination unit 30 calculates a degree of abnormality=100%−0.0385%×7=77.73%, which is transmitted to the warning generation unit 40.

Assume that, in this call, the caller said in one breath that he needed a big money immediately and so a transfer of the money to a predetermined bank account was required. This generates a situation in which the caller is continuously speaking for a certain time which is more than five times of the speaking time on the recipient side. Assume that the time length of the call is 13 minutes.

In the process of a mid-call event in FIG. 15, the operation monitor 922 transmits terminal information to the pattern determination unit 30, the information indicating that the time length of a call is more than five minutes and also the time length of a call is more than ten minutes.

The pattern determination unit 30 refers to the mid-call event model 404 and the call ending model 405 as candidates to transit from the current position, that is, the call starting event model 403. The pattern determination unit 30 chooses the mid-call event model 404.

In the mid-call event model 2000 in FIG. 20, the pattern determination unit 30 transits to the first state S1 through the $37^{th}$ event 2001, and to the second state S2 through the $38^{th}$ event 2011. In the mid-call event model 2000, the states except the initial state Ss are acceptance states, and the pattern determination unit 30 calculates a cumulative probability and a degree of abnormality at each state. The calculation results in the degree of abnormality of 99.82 at the first state S1, and that of 00.94% at the second state S2, which are transmitted to the warning generation unit 40.

At the end of the call, the operation monitor 922 obtains the end time information (at the time: 14:23) in the process of a call ending event in FIG. 16, and transmits the information as terminal information to the pattern determination unit 30. The operation monitor 922 also transmits a call-end signal to the voice data analyzer 921 to stop the speaking-time monitoring process. The voice data analyzer 921 transmits the calculated speaking times on the source side and the recipient side to the pattern determination unit 30.

The pattern determination unit 30 refers to the call ending event model 405 as a candidate to transit from the current position, that is, the mid-call event model 404.

In the call ending event model 2100 in FIG. 21, the pattern determination unit 30 transits to the final state Sf through the $45^{th}$ event 2115 and the $49^{th}$ event 2121, and calculates a degree of abnormality of 99.9995% at the point of time, which is transmitted to the warning generation unit 40.

The warning generation unit 40 can be configured to output warning information for a degree of abnormality equal to or more than a predetermined threshold value Th, in response to the degree of abnormality transmitted from the pattern determination unit 30. In the case with a threshold value Th of 99.95%, in the above example, the degree of abnormality does not reach the threshold value until the transition comes to the final state of the call ending event model 406. Thus, when the transition comes to the final state of the call ending event model 406, the warning generation unit 40 outputs a warning message to the speaker 904, and transmits display data of the warning message to the display 909.

In the above example, a behavior pattern is determined based on the terminal information about the operations and calls on the communication terminal 2, to detect an abnormal call. This means that an abnormality detection apparatus for communication terminal of the present invention is able to detect an abnormal call such as fraud without extraction of keyword from voice data. Accordingly, it is possible to detect even a new fraud call that a prepared keyword detection cannot defense, as an abnormal call.

(Driving of Behavior Pattern Models)

In the above example, only the automaton having the behavior pattern model 400 with the transition states as illustrated in FIG. 24 is solely driven.

The pattern determination unit 30 needs to determine whether or not an automaton reaches an acceptance state through successive events between an unknown initial state and an unknown final state. Thus, if there is an event model that can transit from the initial state Ss based on received terminal information, preferably the model is held as a separately-driven behavior pattern model. This means the increase of driven behavior pattern models based on received terminal information increases the variation in states to transit from the start point of time. In this case, based on received terminal information, all of the driven behavior pattern models are applied to determine whether or not an automaton reaches an acceptance state. The holding of driven behavior pattern models can be actually achieved by holding current transition states and current cumulative probabilities separately.

Figure 25:
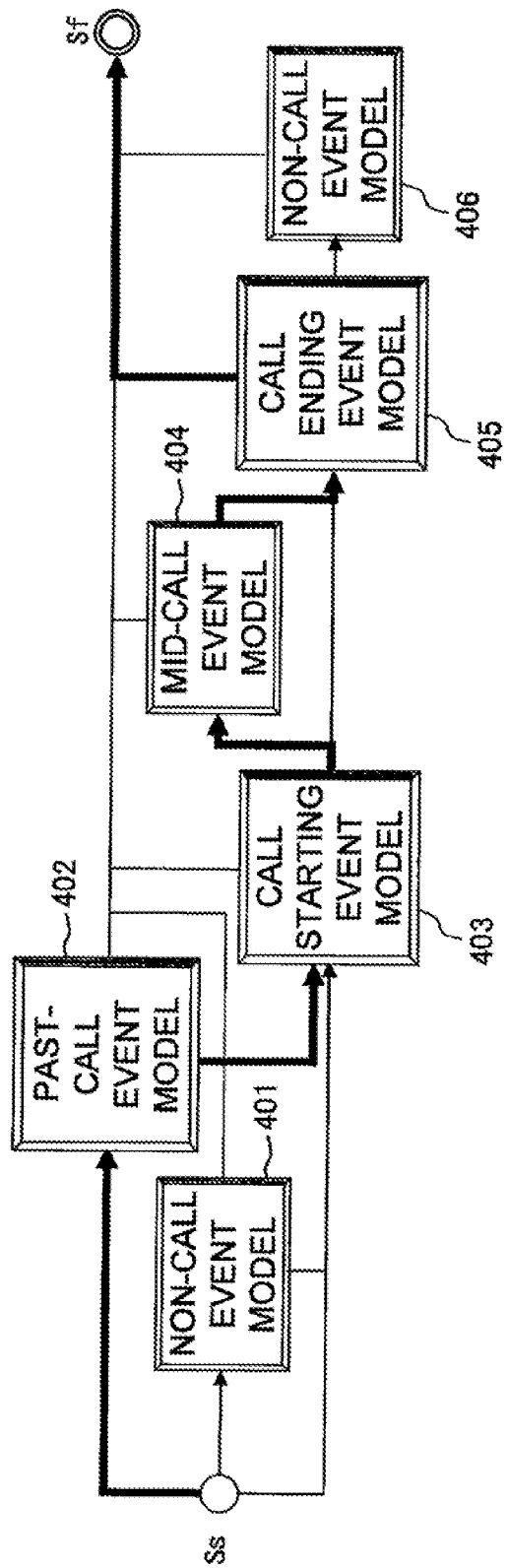
FIG. 25 illustrates an example of an automaton for an event model transition.

FIG. 25 illustrates an example of an automaton that is independently driven according to event models to be transmitted from the initial state in the behavior pattern model.

The automaton as illustrated in FIG. 24 transits to the past-call event model 402 from the non-call event model 401. Accordingly, an automaton can be constructed, for example, in which the initial state Ss comes after the non-call event model 401 and the past-call event model 402 is the first event model to transit. The transitions of event models following the past-call event model 402 may be the same as those illustrated in FIG. 24.

As a result, an automaton as illustrated in FIG. 25 can be driven in parallel with the automaton in FIG. 24.

The automaton in FIG. 25 is configured with the same event models as those in FIG. 24 except the non-call event model 401 in FIG. 24, and has a degree of abnormality of 99.951% at the last event.

As described above, in the case where a plurality of automatons are simultaneously driven, information of a higher degree of abnormality is transmitted to the warning generation unit 40.

If an automaton remains at one event model, the automaton is discarded when the same event model is started. Alternatively, any automaton is preferably discarded when a predetermined period of time has passed since the automaton started.

(Other Example)

A larger number of transitions in the pattern determination unit 30 results in a smaller cumulative probability at the final state. Normalization is, therefore, is performed depending on the number of transitions for the calculation of a degree of abnormality according to the equation: abnormality degree=100%−cumulative probability×number of transitions. Alternatively, an expected value of a cumulative probability for each pattern model is calculated in advance, so that a normalization can be effected by the equation: abnormality degree=expected value−cumulative probability, or the geometric mean equation: abnormality degree=expected value−cumulative probability ($1/n^{th}$ power (n: number of transitions)).

Instead of the normalization of a degree of abnormality, a threshold value Th in the warning generation unit 40 may vary depending on the number of transitions.

In a communication terminal, an abnormal call such as swindle including telephone fraud ("it's me" scam) can be detected in response to a behavior pattern of a user and a call pattern, without using keyword detection from voice data. This is applicable to communication terminals such as fixed-line telephone and IP phone as well as cell-phones.

What is claimed is:

1. An abnormality detection apparatus for communication terminal, comprising:
    a pattern model storage unit configured to store behavior pattern models as a probabilistic model of transition relations of events relevant to operations and calls on a communication terminal, the behavior pattern models include a normal behavior pattern model that represents normal behavior of a user, and an abnormal behavior pattern model that is constructed with events extracted from the normal behavior pattern as factors of a higher degree of abnormality;
    a terminal information obtaining unit configured to detect terminal information about the operations and the calls on the communication terminal;
    a pattern determination unit configured to determine whether or not a current behavior pattern is a normal behavior pattern by comparing the terminal information detected by the terminal information obtaining unit with the behavior pattern models stored in the pattern model storage unit, wherein the abnormal behavior pattern model is used when the communication terminal is engaged with a call; and
    a warning generation unit configured to output predetermined warning information to the communication terminal when the pattern determination unit determines that the terminal information detected by the terminal information obtaining unit is not within a normal behavior pattern.

2. The abnormality detection apparatus for communication terminal according to claim 1, wherein the behavior pattern models stored in the pattern model storage unit are represented by probabilistic automata with event occurrence probabilities, and
    wherein the pattern determination unit calculates a degree of abnormality of the current behavior pattern based on a cumulative probability that is a product of occurrence probabilities of the events in a behavior pattern model to which the current behavior pattern is applied.

3. The abnormality detection apparatus for communication terminal according to claim 1, wherein the terminal information obtaining unit obtains one or a plurality of pieces of information as the terminal information, the information including a start time of a call, an end time of a call, a time length of a call, a ratio between speaking times on the recipient side and the source side, an operation history of an address book, locational information of the terminal, a keyword detected from voice data.

4. The abnormality detection apparatus for communication terminal according to claim 1, further comprising:
    a pattern update unit configured to update an event occurrence probability of each of the behavior pattern models based on the terminal information detected by the terminal information obtaining unit.

5. The abnormality detection apparatus for communication terminal according to claim 4, wherein the pattern update unit updates the behavior pattern models stored in the pattern model storage unit based on behavior patterns collected at a plurality of communication terminals, behavior patterns collected through survey, or behavior patterns collected by global pattern collector that collects behavior pattern models.

6. The abnormality detection apparatus for communication terminal according to claim 1, wherein the warning generation unit outputs the warning information to at least one of predetermined destinations that are registered in a predetermined storage area in the communication terminal.

7. The abnormality detection apparatus for communication terminal according to claim 6, wherein the warning generation unit superimposes the warning information to voice data of a current call on the communication terminal.

8. An abnormality detection method for communication terminal for causing a computer and a cell-phone to function as an abnormality detection apparatus, the method comprising:
    storing behavior pattern models as a probabilistic model of transition relations of events relevant to operations and calls on a communication terminal into a predetermined storage area, the behavior pattern models include a normal behavior pattern model that represents normal behavior of a user, and an abnormal behavior pattern model that is constructed with events extracted from the normal behavior pattern as factors of a higher degree of abnormality;
    detecting terminal information about the operations and the calls on the communication terminal;
    determining whether or not a current behavior pattern is a normal behavior pattern by comparing the detected terminal information with the behavior pattern models stored in the storage area, wherein the abnormal behavior pattern model is used when the communication terminal is engaged with a call; and
    outputting warning information to the communication terminal when the terminal information is not within a normal behavior pattern.

9. The abnormality detection apparatus for communication terminal according to claim 7, wherein the terminal information obtaining unit stores the terminal information in a predetermined storage area while the communication terminal is engaged with a call, and when the communication terminal is disengaged from the call, the pattern determination unit make a determination on the behavior pattern based on the terminal information stored in the predetermined storage area.

10. The abnormality detection method for communication terminal according to claim 8, wherein the warning information is superimposed to voice data of a current call on the communication terminal.

11. The abnormality detection method for communication terminal according to claim 8, wherein the determination whether or not a current behavior pattern is a normal behavior pattern is made only based on an abnormal behavior pattern model when the communication terminal is engaged with a call.

* * * * *